(12) United States Patent
Abercrombie

(10) Patent No.: US 10,048,760 B2
(45) Date of Patent: Aug. 14, 2018

(54) METHOD AND APPARATUS FOR IMMERSIVE SYSTEM INTERFACING

(71) Applicant: Atheer, Inc., Mountain View, CA (US)

(72) Inventor: Nathan Abercrombie, Mountain View, CA (US)

(73) Assignee: Atheer, Inc., Mountain View, CA (US)

( * ) Notice: Subject to any disclaimer, the term of this patent is extended or adjusted under 35 U.S.C. 154(b) by 584 days.

(21) Appl. No.: 13/902,740

(22) Filed: May 24, 2013

(65) Prior Publication Data

US 2014/0351770 A1 Nov. 27, 2014

(51) Int. Cl.
*G06F 3/048* (2013.01)
*G06F 3/01* (2006.01)

(52) U.S. Cl.
CPC .............. *G06F 3/017* (2013.01); *G06F 3/011* (2013.01)

(58) Field of Classification Search
CPC ..... G06F 3/04883; G06F 3/017; G06F 3/0481
USPC ......................................... 715/863, 763, 781
See application file for complete search history.

(56) References Cited

U.S. PATENT DOCUMENTS

| 7,665,033 | B2* | 2/2010 | Byrne | G06F 3/0481 |
| | | | | 715/778 |
| 8,166,421 | B2* | 4/2012 | Magal | G06F 3/017 |
| | | | | 382/218 |
| 8,514,251 | B2* | 8/2013 | Hildreth | G06F 3/017 |
| | | | | 341/20 |
| 8,555,171 | B2* | 10/2013 | Kuo | G06F 3/017 |
| | | | | 709/231 |
| 8,756,508 | B2* | 6/2014 | Ohki | G06F 17/245 |
| | | | | 715/727 |
| 8,869,073 | B2* | 10/2014 | Freeman | G06F 3/017 |
| | | | | 715/716 |
| 8,881,051 | B2* | 11/2014 | Frey | G06F 3/0485 |
| | | | | 715/716 |
| 9,304,674 | B1* | 4/2016 | Townsend | G06F 3/0487 |
| 9,507,417 | B2* | 11/2016 | Dal Mutto | G06F 3/012 |
| 9,600,078 | B2* | 3/2017 | Rafii | G06F 3/017 |
| 9,633,252 | B2* | 4/2017 | Feng | G06K 9/00335 |
| 9,798,388 | B1* | 10/2017 | Murali | G06F 3/016 |
| 9,836,201 | B2* | 12/2017 | Frey | G06F 3/04845 |
| 9,875,406 | B2* | 1/2018 | Haddick | G06K 9/00604 |
| 2011/0022307 | A1* | 1/2011 | Lee | G01C 21/3664 |
| | | | | 701/533 |
| 2011/0047459 | A1* | 2/2011 | Van Der Westhuizen | |
| | | | | G06F 1/1692 |
| | | | | 715/702 |

(Continued)

*Primary Examiner* — David Phantana-Angkool
(74) *Attorney, Agent, or Firm* — Mohr Intellectual Property Law Solutions, P.C.

(57) ABSTRACT

Disclosed are methods and systems for immersive system interfacing. A stimulus is defined in the form of a gesture or posture with an end-effector such as a hand. The stimulus is sensed within an environment and communicated to a processor. In response to the stimulus the processor generates a user interface, the interface being outputted near the end-effector. The stimulus may be identical for all times, all places, and all conditions in the environment. The interface may be generated and outputted in response to the stimulus for all times, places, and conditions in the environment. The apparatus includes a processor adapted to define a stimulus in the form of an end-effector gesture or posture, and to generate a user interface in response to the stimulus. A sensor is adapted to sense the stimulus, and a display is adapted to output the interface to an environment.

50 Claims, 15 Drawing Sheets

(56) References Cited

U.S. PATENT DOCUMENTS

| | | | |
|---|---|---|---|
| 2011/0214082 A1* | 9/2011 | Osterhout | G02B 27/017 715/773 |
| 2011/0221656 A1* | 9/2011 | Haddick | G02B 27/017 345/8 |
| 2013/0014052 A1* | 1/2013 | Frey | G06F 3/0485 715/800 |
| 2013/0033483 A1* | 2/2013 | Im | G06F 3/0482 345/419 |
| 2013/0047121 A1* | 2/2013 | Kao | G06F 9/44505 715/810 |
| 2013/0278631 A1* | 10/2013 | Border | G02B 27/017 345/633 |
| 2014/0168261 A1* | 6/2014 | Margolis | G06F 3/011 345/633 |
| 2014/0237432 A1* | 8/2014 | Geurts | G06F 3/005 715/863 |
| 2014/0266988 A1* | 9/2014 | Fisher | G02B 27/017 345/8 |
| 2014/0282224 A1* | 9/2014 | Pedley | G06F 3/0485 715/784 |
| 2014/0282274 A1* | 9/2014 | Everitt | G06F 3/017 715/863 |
| 2014/0282275 A1* | 9/2014 | Everitt | G06F 3/017 715/863 |
| 2014/0347390 A1* | 11/2014 | Poulos | G06T 19/006 345/633 |

* cited by examiner

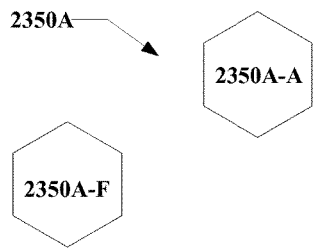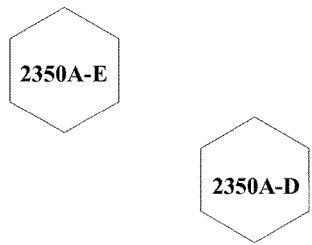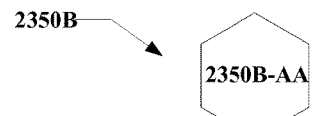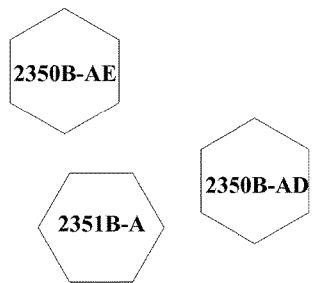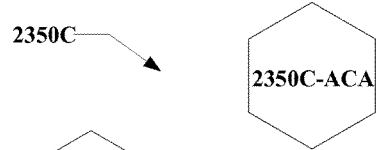
FIG. 23A
FIG. 23B
FIG. 23C

METHOD AND APPARATUS FOR IMMERSIVE SYSTEM INTERFACING

TECHNICAL FIELD

The disclosed technique relates to interfacing with interactive systems. More particularly, this disclosed technique relates to approaches for calling and manifesting interfaces for interacting with three dimensional augmented and/or virtual environments, and/or with processors generating and/or controlling those environments.

DESCRIPTION OF RELATED ART

Generally speaking, a user interface is a construct that supports interaction between a system and a user of that system. The term is frequently applied to computers and other information and processing systems.

To date, many user interfaces have been designed to support interaction with environments that exclude the users thereof. That is, the user cannot "get to" the environment themselves, typically because the environment exists within some hardware device. For example, a personal computer may manifest a user environment in the form of a "desktop"; insofar as the user perceives the environment, that environment typically exists within a PC monitor or other physical device. The user may perceive the environment, and for some displays (such as "3D" displays) the environment may even have the appearance of a three dimensional volume, but even so the cannot enter the environment. Thus another hardware device may be needed to permit the user to interact with the environment, for example a keyboard, mouse, touch-sensitive surface, etc.

However, for some environments, such as virtual and/or augmented reality environments, it may be possible for users to reach inside or even bodily immerse themselves therein. In such instances the user is not necessarily external to the environment, and requiring the user to manipulate the environment as though the user were still external, e.g. through a keyboard, mouse, touch screen, etc., may be of limited usefulness, or otherwise problematic.

There is a need for a simple, effective method and apparatus to facilitate user interactions with partially and/or fully immersive environments, including but not limited to three dimensional environments.

SUMMARY

The disclosed technique contemplates a variety of systems, apparatus, methods, and paradigms for interfacing with interactive environments, including but not limited to postural and gestural interfaces with augmented reality and virtual reality environments.

In one embodiment of the disclosed technique, a method is provided that includes in a processor defining a stimulus, the stimulus including executing an end-effector gesture or an end-effector posture. The method also includes sensing the stimulus in an environment and communicating the stimulus to the processor. In response to the stimulus, in the processor a user interface is generated, the interface being outputted within the environment near the stimulus.

The environment may be a three dimensional environment. The environment may be a real-world environment, an augmented reality environment, or a virtual reality environment.

The stimulus may include a hand gesture or hand posture. The stimulus may include executing a hand configuration in the environment wherein at least three digits of the hand are substantially extended. The digits may be the thumb, first finger, and second finger of the hand.

Sensing the stimulus may include distinguishing at least three digits of the hand. Sensing may be performed optically.

The hand configuration may include the three digits being at least partially spread. The configuration may define at least two gaps of at least partial spreading between at least three groups of digits with at least one digit in each group.

The stimulus may be a static posture or as a dynamic gesture.

The stimulus may include transitioning from a first hand configuration to a second hand configuration wherein at least three digits of the hand are substantially extended. The first configuration may have the thumb, first finger, and second finger of the hand clenched together. The first configuration may have the thumb, first finger, and second finger pinched together so as to be in contact at the fingertips.

The interface may be outputted aligned with a plane defined by the tips of the digits. The interface may be outputted aligned with a plane defined by the palm of the hand. The interface may be outputted in front of the hand. The interface may be outputted so that at least part of the interface is in contact one or more digits.

The interface may include one or more manipulation sites. The method may include defining in the processor an input manipulation for the manipulation site, and defining in the processor an input for the manipulation site, such that when the input manipulation is applied to the manipulation site the input is applied to the processor. The manipulation site may be a contact site.

The interface may be a graphical user interface. The interface may include visible markings corresponding with the manipulation site. The interface may have multiple manipulation sites. At least some of the manipulation sites may be outputted disposed in at least a partial ring circumscribing the hand or a portion thereof. Manipulation sites may be adjacent and/or continuous, or discrete.

The method may include defining in the processor an active condition for the manipulation site wherein the manipulation site applies input to the processor and an inactive condition wherein the manipulation site does not apply input to the processor. The method may include defining a switch manipulation such that applying the switch manipulation to the interface switches at least one manipulation site between active and inactive conditions. The method may include defining in the processor a first switch manipulation such that applying the first switch manipulation to the interface switches at least one manipulation site from active condition to inactive condition, and defining in the processor a second switch manipulation such that applying the second switch manipulation to the interface switches at least one manipulation site from said inactive condition to active condition. The manipulation site may be outputted when in the inactive condition.

At least some manipulation sites may be outputted disposed in first and second concentric partial or full rings circumscribing the hand or a portion thereof. A manipulation site may be outputted disposed near a tip of one of the three digits The method may include configuring the interface based on any or all of: the status of the environment, the content of the environment, the location of the interface within the environment, the location of the environment, the time, conditions within the environment, conditions external to the environment, the identity of the user, the condition of the user, and non-input behavior of the user. The method may include generating the content of the interface based on any or all of: the status of the environment, the content of the environment, the location of the interface within the environment, the location of the environment, the time, conditions within the environment, conditions external to the environment, the identity of the user, the condition of the user, and non-input behavior of the user.

The stimulus may be identical for all times, places, and conditions in the environment. The steps of generating and outputting the interface in response to sensing the stimulus may be executed for all times, places, and conditions in the environment.

The method may include instantiating executable instructions on the processor for implementing steps of defining the stimulus and generating the interface. The method may include instantiating the executable instructions on the processor within an operating system for the processor.

In another embodiment of the disclosed technique, an apparatus is provided that includes a processor adapted to define a stimulus in the form of executing a posture or a gesture with an end-effector gesture. The processor is further adapted to generate a user interface in response to the stimulus. The apparatus includes a sensor in communication with the processor and adapted to sense the stimulus, and a display in communication with the processor and adapted to output the interface within an environment near the location of the stimulus.

The display may be adapted to output the environment.

The display may be a stereo display. The sensor may be adapted to sense the three dimensional position and/or the three dimensional orientation of the stimulus. The sensor may be a stereo sensor. The sensor may be an image sensor.

The processor, display, and sensor may be disposed on a wearable device. The processor, display, and sensor may be disposed on a head mounted display.

In another embodiment of the disclosed technique, a method is provided that includes in a processor defining a stimulus for a three dimensional environment, the stimulus being a hand gesture or posture with at least the thumb, a first finger, and a second finger substantially extended and at least partially spread, with the stimulus being identical for all times, places, and conditions in said three dimensional environment. The method includes optically sensing the position and orientation of the stimulus in the environment, and communicating the stimulus to the processor. In response to the stimulus, generating with the processor a graphical user interface with contact manipulation sites and said markings corresponding to the manipulation sites, defining in the processor input manipulations for the manipulation sites such that when the input manipulations are applied to the manipulation sites the inputs are applied to the processor, and visibly outputting the interface near the location of the stimulus. The interface is outputted such that the interface is aligned with a plane defined by the tips of the thumb, first finger, and said second finger, with the interface disposed in front of the hand, and at least a portion of the interface in contact with at least one of the tips. The steps of generating and outputting the interface in response to sensing the stimulus are executed for substantially all times, places, and conditions in the three dimensional interface.

In another embodiment of the disclosed technique, an apparatus is provided that includes a body adapted to be worn on a user's head, and a processor engaged with the body and adapted to define a stimulus for a three dimensional environment, the stimulus being a gesture or posture by an end-effector. The apparatus includes first and second visual displays in a stereo configuration engaged with the body and in communication with the processor, the displays being adapted to output the three dimensional environment and being arranged so as to generate stereo output, the displays also being engaged with the body such that the displays are disposed near to aligned with the user's eyes when the user wears the body. The apparatus also includes at least one image sensor in communication with the processor, the sensor being adapted to sense the stimulus. The processor is further being adapted to generate a graphical user interface in response to the stimulus. The display is further adapted to output the interface within the three dimensional environment near the location of the stimulus.

In another embodiment of the disclosed technique, an apparatus is provided that includes means for defining a stimulus in the form of a posture or gesture with an end-effector, means for sensing the stimulus in a three dimensional environment, means for communicating the stimulus to the processor, means for generating with the processor a user interface in response to the stimulus, and means for outputting the interface within the three dimensional environment near the location of the end-effector.

BRIEF DESCRIPTION OF THE SEVERAL VIEWS OF THE DRAWINGS

Like reference numbers generally indicate corresponding elements in the figures.

FIG. 23A through FIG. 23C show an arrangement for nested interface levels according to the disclosed technique.

DETAILED DESCRIPTION

Figure 1:
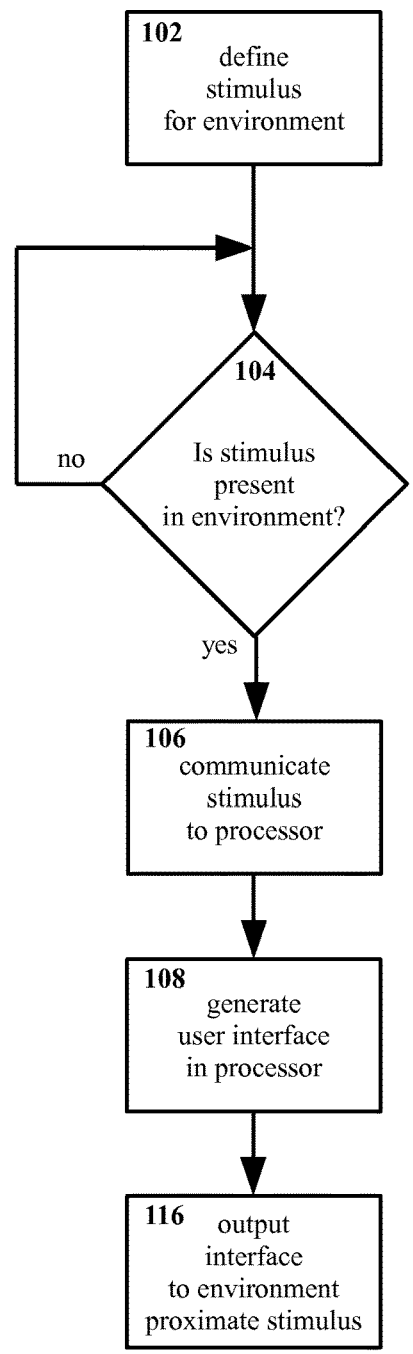
FIG. 1 shows an example embodiment of a method for interfacing with an interactive environment, according to the disclosed technique.

Referring to FIG. 1, a method for interfacing with an interactive environment according to the disclosed technique is shown therein.

In the example method shown in FIG. 1, a stimulus is defined 102 for an interactive environment. Typically, though not necessarily, the environment is one such that a person wishing to interact therewith may dispose some or all of his or her body within the environment. For example, the interactive environment may be a virtual reality and/or an augmented reality environment manifested within physical space, possibly generated and/or controlled by a data processor. However, the disclosed technique is not particularly limited with regard to an environment for which the stimulus is defined 102. For example, for at least certain embodiments, the environment may be fully or at least partially a real-world environment.

The disclosed technique likewise is not particularly limited with regard to the stimulus as defined in step 102. Typically, though not necessarily, the stimulus may be a hand posture or a hand gesture as executed by a user whose hand (and possibly full body) is disposed within the interactive environment. However, other stimuli may be equally suitable, including but not limited to voice commands, facial gestures, ocular movements, full-body postures and/or gestures, etc.

Moving on in FIG. 1, a determination is made 104 as to whether the stimulus (defined in step 102) is present within the environment. If the stimulus is determined not to be present, then the method repeats step 104. That is, the search for the defined stimulus is ongoing until the stimulus is detected (or until some other end condition is imposed, e.g. the environment is shut down, etc.).

The manner by which the stimulus is determined 104 to be present (or not present) is not particularly limited. It will be understood that the manner by which a stimulus is determined to be present within an environment will depend, to at least some degree, on the definition of the stimulus and the specifics of the environment in question. For example, for a stimulus defined as a hand posture or hand gesture, it may be suitable for at least some embodiments to monitor the environment using one or more visual sensors such as digital cameras in order to determine whether a hand is present within the environment, and/or whether that hand is executing a defined gesture or posture. However, the disclosed technique is not limited only to the use of visual sensors in detecting a stimulus. Ultrasonic motion sensors, thermal sensors, laser tomographic sensors, etc. may be equally suitable for determining whether a posture or a gesture is present. Likewise, audio sensors might be suitable for sensing a voice command, and yet other sensors likewise may be suitable for determining different forms of stimulus.

If the stimulus is determined to be present in the environment 104, then the stimulus is communicated to a processor 106. Typically though not necessarily, the processor to which the stimulus is communicated 106 also generates the environment or is in control thereof, or the processor to which the stimulus is communicated 106 is itself in communication with another distinct processor (if any) that generates the environment or is in control thereof. However, neither condition is required.

Once the stimulus is communicated to the processor 106, the processor then generates a user interface 108. The interface typically will serve as a mechanism by which the user may control the environment, input data to the processor(s) (if any) generating and/or controlling the environment, communicate with persons and/or systems external to the environment, etc.

The disclosed technique is not particularly limited with regard to the type of user interface. It will be understood that the interface may vary depending at least in part upon the particulars of the interactive environment. For example, for an augmented or virtual reality environment that is partially or entirely visual in nature, a visible interface may be suitable. However, the disclosed technique is not limited only to visual interfaces, and other interfaces may be suitable for visual environments and/or for non-visual environments.

Returning again to FIG. 1, the interface is outputted 116 to the environment in proximity to the stimulus. For example, for a visual augmented/virtual reality environment and a stimulus defined as a hand posture or hand gesture, the interface may be outputted 116 in visual form, spatially near and/or in contact with the hand of the user that generated the stimulus. However, such an arrangement is an example only, and other arrangements may be equally suitable.

For at least some embodiments of the disclosed technique, the stimulus may be defined 102 so as to be substantially universal within a particular interactive environment. That is, the stimulus will be defined so as to be substantially identical for substantially all times, substantially all places, and/or substantially all conditions within the environment, such that a single stimulus may be relied upon to call an interface (as described below) consistently throughout the environment. Thus, the step of defining the stimulus 102 may be executed substantially similarly at substantially all times, in substantially all places, and/or under substantially all conditions within the environment. Likewise, the steps of generating the interface 108 and outputting the interface 116 in response to determining 104 that the stimulus has been executed also may be executed substantially similarly at substantially all times, in substantially all places, and/or under substantially all conditions within the environment. Such an arrangement may be advantageous at least in that a single uniform stimulus may then be relied upon to manifest an interface in a reliable and/or predictable fashion throughout the interactive environment. Users could then rely upon such a single stimulus (e.g. a gesture) to facilitate interface interactions throughout the interactive environment.

However, the use of a substantially same stimulus throughout an environment does not necessarily imply that the stimulus is either preset or unalterable. For example, for at least some embodiments, the user may be enabled to initially choose the stimulus from a menu, demonstrate a stimulus that is to be used, etc. Users may also, in at least some embodiments, be enabled to change the stimulus at their discretion, either for the entire environment or for portions thereof.

Figure 2:
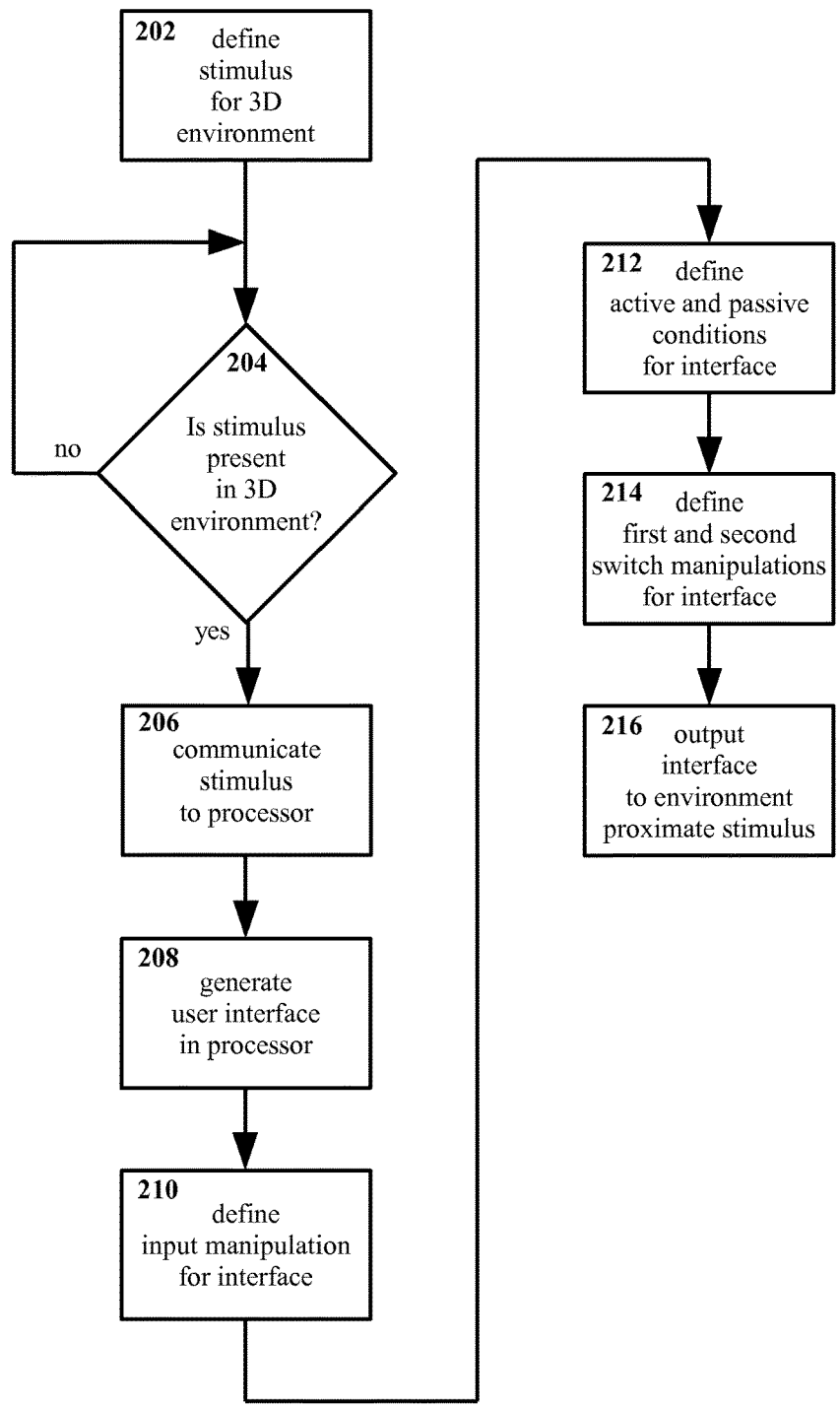
FIG. 2 shows another example embodiment of a method for interfacing with an interactive environment, according to the disclosed technique.

Turning to FIG. 2, another method for interfacing with an interactive environment according to the disclosed technique is shown therein. The method of FIG. 2 is more narrowly defined than the method of FIG. 1. For purposes of clarity, the method of FIG. 2 applies to embodiments having 3D environments, and also provides additional details illustrating how the method might be implemented in a particular embodiment. However, the disclosed technique is not limited only to 3D environments, or to the other details shown in FIG. 2.

In the method shown in FIG. 2, a stimulus is defined 202 for a three dimensional interactive environment. As previously noted with regard to FIG. 1, the environment may be a visual virtual reality and/or augmented reality environment, but the invention is not limited thereto.

A determination is made 204 as to whether the stimulus, defined in step 202, is present within the interactive three dimensional environment. If it is determined that the stimulus is not present, the method repeats step 204, continuing to monitor for the presence of the stimulus.

If the stimulus is determined in step 204 to be present in the interactive three dimensional environment, the stimulus is then communicated to a processor 206. The processor then generates a user interface 208.

Moving on in FIG. 2, input manipulation may be defined for the interface 210. For example, consider a visible interface generated in response to a stimulus in the form of a hand posture or hand gesture. Such an interface might include visible controls, with input manipulations then being defined as hand postures and/or hand gestures that are applied to the visible controls. As a more concrete example, if virtual touch keys or other visible contact points are generated as controls for an interface, input manipulations may be defined as the user's fingertips making contact with one or more of the touch keys. However, these are examples only, and input manipulations are not limited only to touch key contacts.

Active and/or inactive conditions may also be defined 212 for the user interface. That is, not all portions of an interface will necessarily be active at all times. Various portions of the interface may be active or inactive at different times and/or under different conditions. For example, an interface that controls programs running in a virtual or augmented reality environment may show controls for common or important programs even when those programs are not currently running, with those controls being visible but inactive until/unless the relevant programs are activated. Alternately, if the number of available controls in a particular interface is larger than may be conveniently manipulated at one time, then under some conditions some controls (or groups of controls) may be left inactive, e.g. grayed out and clustered to one side of the interface, so as to avoid excessive complexity in the interface.

The disclosed technique is not particularly limited with regard to definitions of active and inactive conditions. As noted above, for certain embodiments it may be suitable to visibly identify inactive controls e.g. by graying out the inactive controls, and/or to segregate inactive controls spatially from active controls e.g. by displacing the inactive controls to one side of the active portion of the interface. However, such arrangements are examples only, and other arrangements for identifying and/or segregating inactive controls may be equally suitable. Likewise, identifying and segregating inactive controls and even the use of an inactive definition itself is an example only and is not required, and other arrangements may be suitable.

Returning to FIG. 2, a switch manipulation may be defined 214. That is, for embodiments wherein active and inactive conditions are defined 212 for the user interface and/or portions thereof, a switch manipulation may be defined 214 such that executing the switch manipulation moves the interface or a portion thereof between the active and inactive conditions. For example, for an interface incorporating touch keys, a hand posture or gesture may be defined to serve as an input to toggle keys between active and inactive status.

For some embodiments it may be suitable for at least some embodiments to define two or more switch manipulations. For example, a first switch manipulation might be defined to activate an inactive interface or portion thereof, and a second switch manipulation might also be defined to deactivate an active interface or portion thereof. Alternately, for some embodiments one switch gesture might simultaneously active some portions of an interface while inactivating other portions. For example, for a touch key interface, a single gesture might activate all (or some) inactive keys, while activating all (or some) active keys. Other arrangements may also be equally suitable.

Continuing in FIG. 2, the interface is output 216 to the environment in proximity to the stimulus.

Figure 3A:
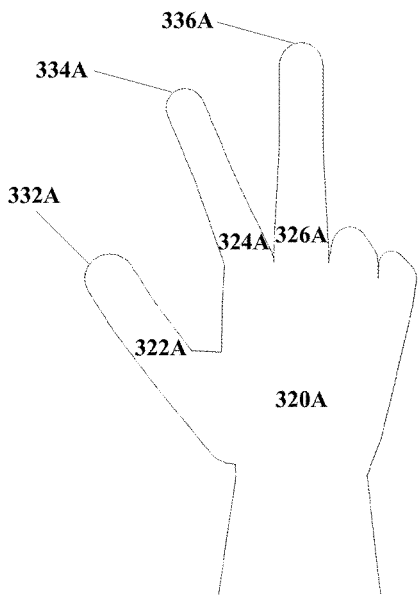
FIG. 3A shows a view of an example embodiment of a hand posture for calling an interface within an interactive environment, according to the disclosed technique.

FIG. 3A shows an example of a stimulus for calling an interface within an interactive environment, according to the disclosed technique. In particular, FIG. 3A shows a hand executing a posture (which may or may not represent a portion of a gesture) as a stimulus. It is emphasized that the posture/gesture illustrated is an example only, and that the disclosed technique is not necessarily limited thereto.

In the arrangement shown in FIG. 3A, a hand 320A is shown in a posture as might be defined to serve as a stimulus for an interactive environment. The hand 320A is disposed in a configuration with three digits (specifically the thumb, forefinger, and middle finger) thereof 322A, 324A, and 326A substantially extended. The extended digits 322A, 324A, and 326A are also partially spread, so that some distance exists between the fingertips 332A, 334A, and 336A.

FIG. 3A, as a static illustration, does not in itself show motion. Thus, as illustrated, the hand configuration in FIG. 3A may be considered to be a posture, that is, a substantially static position of the hand 320A. However, it will be understood that the hand configuration shown in FIG. 3A may as easily represent a portion of a dynamic hand gesture, wherein the user's hand 320A moves into the configuration shown in FIG. 3A from another position, wherein the user's hand 320A moves to another position from the configuration shown in FIG. 3A, and/or wherein the user's hand 320A moves through the configuration shown in FIG. 3A in between other configurations.

Thus, the configuration in FIG. 3A may be executed as a posture of the user's hand 320A and/or executed as a portion of a gesture thereof, as a stimulus defined for an interactive environment.

Figure 3B:
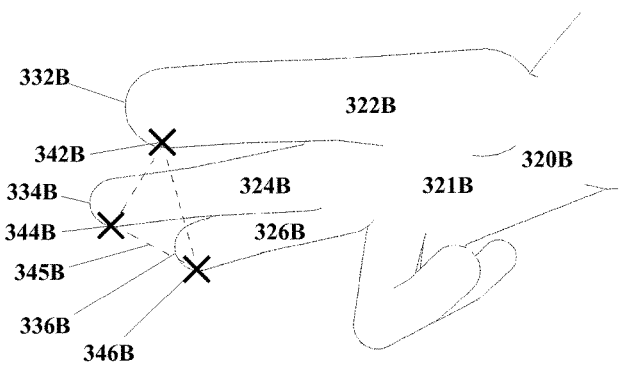
FIG. 3B shows another view of a hand posture similar to that in FIG. 3A, indicating a plane defined by three fingers thereof.

FIG. 3B shows another view of a posture similar to that in FIG. 3A. FIG. 3B shows a hand 320B from a perspective below and to the left of the hand 320B. As is visible in FIG. 3B, the hand 320B therein has three digits 322B, 324B, and 326B substantially extended and partially spread such that the fingertips 332B, 334B, and 336B thereof are separated.

In addition, FIG. 3B shows X symbols at points 342B, 344B, and 346B on the fingertips 332B, 334B, and 336B, respectively, approximately where the pads of the fingers would be. As may be seen the three points 342B, 344B, and 346B on the fingertips 332B, 334B, and 336B, respectively, together define a plane 345B, a portion of which is shown by the three dashed lines connecting the points 342B, 344B, and 346B marked by the X symbols. The potential significance of such geometries are described in more detail below.

The use of a posture and/or gesture wherein three digits 322B, 324B, and 326B of a hand 320B are substantially extended and at least partially separated is an example only. However, such an arrangement may be advantageous for at least certain embodiments.

For example, identifying three points is sufficient to characterize the position and orientation of a rigid object; while a hand 320B is not a rigid object over time, when considering a brief instant in time a hand 320B may be treated as a rigid object for at least certain purposes, e.g. determining the position and orientation of the hand 320B at that instant given knowledge of an approximate configuration of the hand 320B (i.e. the posture thereof).

A posture or gesture with a hand 320B having three digits 322B, 324B, and 326B at least partially separated offers three distinct targets for identification in the form of the fingertips 332B, 334B, and 336B thereof. Approaches for sensing a stimulus in the form of a hand, such as through the use of one or more optical sensors, may thus use the spread digits 322B, 324B, and 326B as distinguishing features for determining whether the defined stimulus exists or not. That is, sensing the stimulus may constitute detecting and distinguishing at least three separate digits 322B, 324B, and 326B on the hand 320B.

In addition, for purposes of outputting the interface proximate the stimulus—in the example shown, outputting an interface near the user's hand 320B—use of three points associated with three digits 322B, 324B, and 326B may be useful in determining a suitable location to output the interface. For example, a typical human hand 320B may be adept at manipulations in front of the hand 320B, i.e. on the palm side of the hand 320B, and likewise may be adept at manipulations that occur in front of the digits 322B, 324B, and 326B thereof. Thus, for at least certain embodiments, it may be suitable to output an interface in front of the user's hand 320B, and/or to output the interface substantially aligned with a plane defined, for example, by the fingertips 322B, 324B, and 326B of the hand 320B, e.g. as defined by the points 342B, 344B, and 346B marked with an X, and/or as defined by the palm 321B of the hand 320B, and/or by some other surface, feature, or combination of features thereof.

Figure 3C:
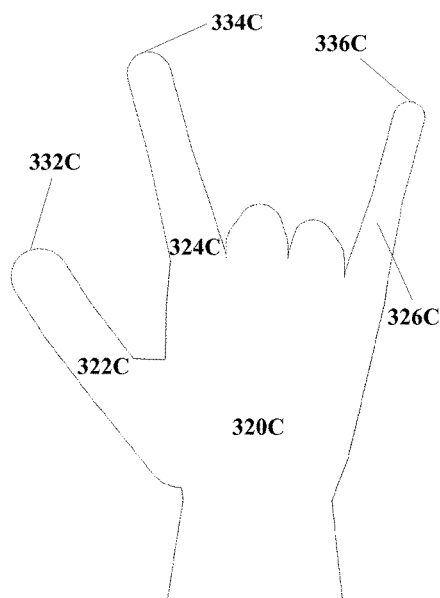
FIG. 3C shows another example embodiment of a hand posture for calling an interface within an interactive environment, according to the disclosed technique.

As noted, the use of a hand gesture having three distinct, substantially extended, and/or at least partially digits as a stimulus is an example only. However, even for such embodiments considerable variation may be possible. For example, FIG. 3C shows an arrangement that, as in FIG. 3A, includes a hand 320C disposed in a configuration with three digits thereof 322C, 324C, and 326C substantially extended, and with the extended digits 322C, 324C, and 326C partially spread so that some distance exists between the fingertips 332C, 334C, and 336C. However, where in FIG. 3A the substantially extended digits were the thumb, index finger, and middle finger, in FIG. 3C the substantially extended digits are the thumb, index, and little fingers. Such an arrangement may be equally suitable for at least some embodiments.

Figure 3D:
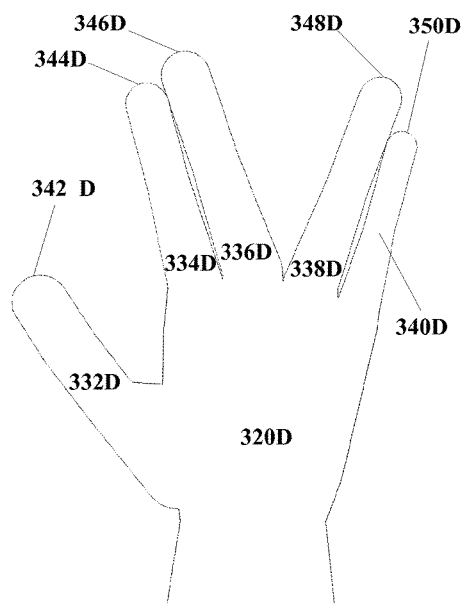
FIG. 3D shows another example embodiment of a hand posture for calling an interface within an interactive environment, according to the disclosed technique

Furthermore, for at least some embodiments it may be possible to distinguish and consider three digits even when not all such digits are individually spread and/or distinguishable. For example, FIG. 3D shows an arrangement with a hand 320D wherein all five digits 332D, 334D, 336D, 338D, and 340D are extended, but wherein the fingertips 342D, 344D, 346D, 348D, and 350D thereof are not all spread from one another. Specifically, two fingertips 344D and 346D are substantially adjacent, as are two other fingertips 348D and 350D. Nevertheless, as may be seen in FIG. 3D the fingers 332D, 334D, 336D, 338D, and 340D still are spread in such a way as to define two gaps representing at least partial spreading of the fingers 332D, 334D, 336D, 338D, and 340D and defining the fingers 332D, 334D, 336D, 338D, and 340D into groups of one or more, so as to produce at least three such groups. Thus distinguishing three points representing and/or including fingertips, those points being spread apart from one another, may be suitable and/or functionally similar to distinguishing three individual fingertips, insofar as both approaches utilize three points of recognition for identifying a posture and/or gesture.

However, it is emphasized that the disclosed technique is not limited to gestures or postures having only three distinguishable fingertips or other points or features, nor necessarily to gestures or postures overall.

Figure 4A:
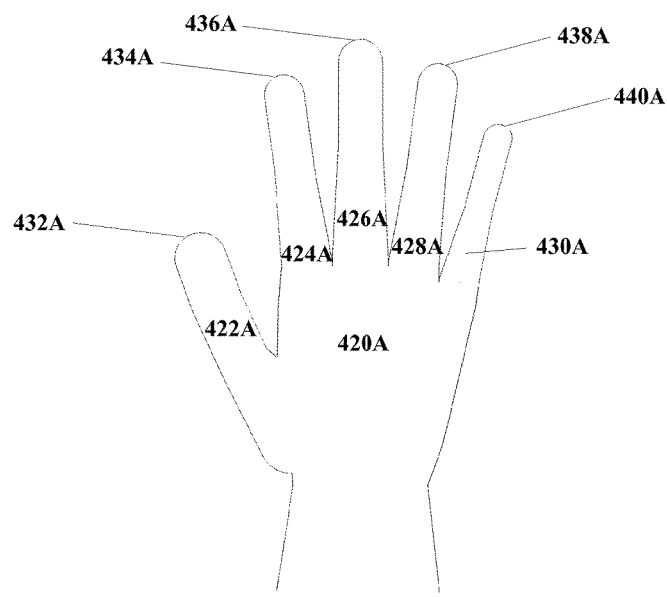
FIG. 4A shows a view of another example embodiment of a hand posture for calling an interface within an interactive environment, according to the disclosed technique.

Turning to FIG. 4A, an arrangement is shown therein of another example of a stimulus for calling an interface within an interactive environment according to the disclosed technique, that stimulus being in the form of a hand posture or gesture. In the arrangement shown in FIG. 4A, a hand 420A is shown disposed in a configuration with all five digits 422A, 424A, 426A, 428A, and 430A substantially extended, and with the extended digits 422A, 424A, 426A, 428A, and 430A partially spread so that some distance exists between the fingertips 432A, 434A, 436A, 438A, and 440A.

From FIG. 4A it may be seen that (as previously stated) that the disclosed technique is not limited to gestures or postures having only three distinguishable fingertips or other points or features. More particularly, the example embodiment shown in FIG. 4A represents a gesture or posture having all five fingertips 432A, 434A, 436A, 438A, and 440A extended. Thus, for an arrangement wherein postures are defined and/or identified based on distinguishing tips of extended fingers, it may be suitable to identify all five fingers (or some other number).

It is noted that for some embodiments, a single gesture definition may encompass multiple variations on hand gestures and postures. For example, as previously described with regard to FIG. 3A through FIG. 3D, a stimulus might be defined as posture or gesture wherein at least three distinguishable fingers (or groups thereof) of a hand are substantially extended and at least partially spread. For such an definition, all four of the variations shown in FIG. 3A through FIG. 3D might satisfy the defined conditions. Likewise, a posture or gesture of a hand with all five fingers substantially extended and at least partially spread as shown in FIG. 4A might also satisfy the defined conditions. For at least certain embodiments the postures in FIG. 3A through FIG. 3D and FIG. 4A through FIG. 4C might all be considered to be the same gesture (at least for purposes of applying and/or sensing a stimulus), given the aforementioned stimulus definition.

Although much of the discussion herein addresses embodiments that define hand postures and/or gestures in terms of fingertip points, and/or that identify hand postures and/or gestures based on distinguishing fingertip points, this is an example only. The disclosed technique is not limited only to definition of hands using fingertip points. Moreover, the disclosed technique is not necessarily limited to definition and/or identification relying on points at all; other arrangements may be suitable, including but not limited to approaches based on defining and/or identifying geometric edges, outlines, color transitions, distances, etc.

Figure 4B:
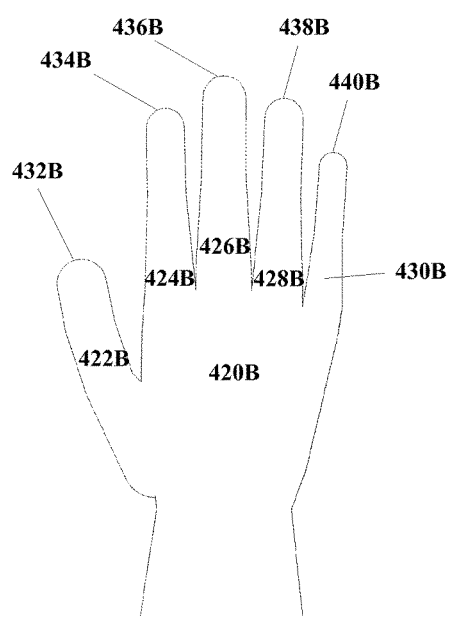
FIG. 4B shows a view of another example embodiment of a hand posture for calling an interface within an interactive environment, according to the disclosed technique.
Figure 4C:
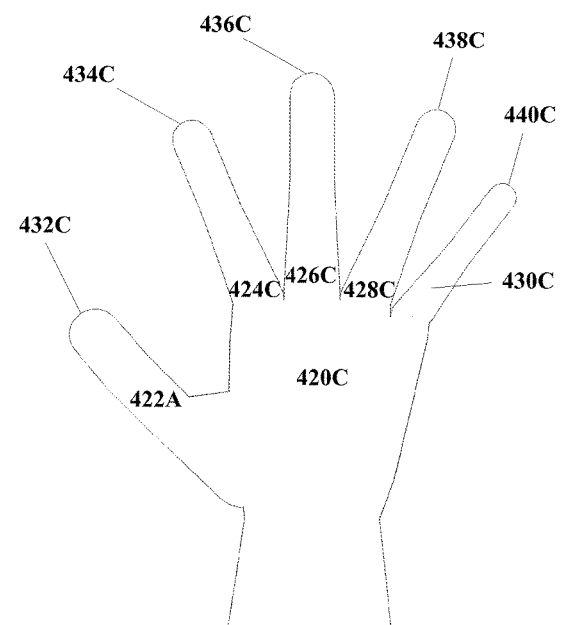
FIG. 4C shows a view of another example embodiment of a hand posture for calling an interface within an interactive environment, according to the disclosed technique.

Even for embodiments wherein a stimulus is defined as a hand posture or gesture with at least three digits (or groups thereof) substantially extended and at least partially spread, other features of a posture or gesture such as the degree to which the digits are spread may vary. For example, FIG. 4B and FIG. 4C show two postures similar to that in FIG. 4A. FIG. 4B shows a hand 420B with digits 422B, 424B, 426B, 428B, and 430B substantially extended, and with the extended digits 422B, 424B, 426B, 428B, and 430B partially spread so that some distance exists between the fingertips 432B, 434B, 436B, 438B, and 440B. However, the digits 422B, 424B, 426B, 428B, and 430B are spread to a lesser degree in FIG. 4B than the digits in FIG. 4A. Similarly, FIG. 4C shows a hand 420C with digits 422C, 424C, 426C, 428C, and 430C substantially extended, and with the extended digits 422C, 424C, 426C, 428C, and 430C partially spread so that some distance exists between the fingertips 432C, 434C, 436C, 438C, and 440C, but with the digits 422C, 424C, 426C, 428C, and 430C spread to a greater degree in FIG. 4C than the digits in FIG. 4A. Absent limits to maximum and/or minimum hand spread in a definition for a stimulus, FIG. 4A, FIG. 4B, and/or FIG. 4C might all be considered to be the same gesture for at least certain embodiments, with all three variations being detected and/or accepted as a stimulus.

Similarly, other features including but not limited to the degree to which fingers are extended, degree of wrist bend (if any), orientation of hand and/or fingers, may vary from one embodiment to another, and may be permitted to vary within a single embodiment. Although definitions that include specific limits on those or other features are not excluded, neither are specific limits for such features necessarily required for the disclosed technique.

Figure 5A:
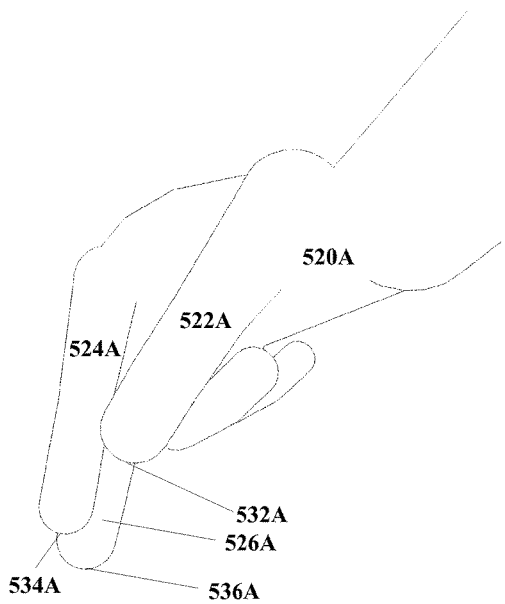
FIG. 5A shows a view of an initial portion of an example embodiment of a hand gesture for calling an interface within an interactive environment, according to the disclosed technique.

Referring now to FIG. 5A, as has been noted the stimulus for certain embodiments of the disclosed technique may defined to be or include a hand gesture, that is, a dynamic motion or transformation of a hand (as opposed to a static hand posture). In defining a gesture as a stimulus, for certain embodiments it may be useful to define two or more distinct postures, specific motions, etc. For example, a gesture might be defined as beginning with one posture and transitioning to another posture, transitioning through a series of different postures, executing some motion with a hand posture, etc.

FIG. 5A shows an arrangement for an initial configuration of an example hand gesture as might be defined as a stimulus. Therein, the hand 520A is configured such that three digits 522A, 524A, and 526A are pinched together. Consequently, the digits 522A, 524A, and 526A are in contact with one another at the tips thereof 532A, 534A, and 536A.

Figure 5B:
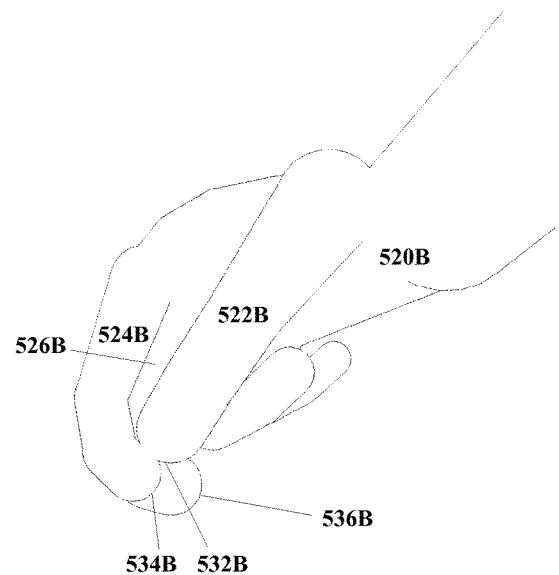
FIG. 5B shows a view of an initial portion of another example embodiment of a hand gesture for calling an interface within an interactive environment, according to the disclosed technique.
Figure 5C:
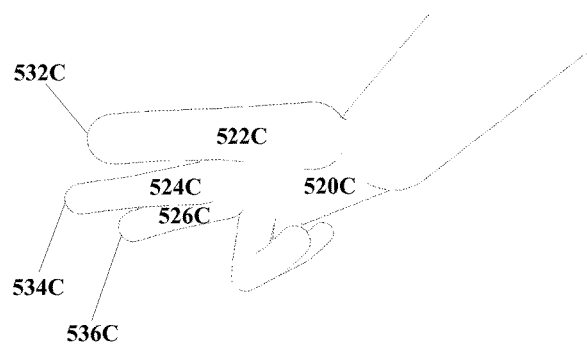
FIG. 5C shows a view of a terminal portion of an example embodiment of a hand gesture for calling an interface within an interactive environment, according to the disclosed technique.

FIG. 5C shows an arrangement for a final configuration of an example hand gesture. The configuration in of the hand 520B in FIG. 5C is similar to that in FIG. 3A and FIG. 3B, that is, three digits 522A, 524A, and 526A substantially extended with the tips thereof 532A, 534A, and 536A being at least partially separated. Thus, a gesture as shown by a combination of FIG. 5A and FIG. 5C might be described as constituting a transition from a "pinch" to an "open hand".

As with postures, many variations on gestures may be possible for various embodiments, and even for a given definition. For example as shown in FIG. 4B an initial posture of a hand 520B is shown with three digits 522B, 524B, and 526B pinched together such that the digits 522B, 524B, and 526B are in contact with one another at fingertips 532B, 534B, and 536B. However, as may be observed through comparison of FIG. 4A and FIG. 4B, although the two initial postures may meet a single definition—at least three digits pinched together such that the digits are in contact with one another at the fingertips—FIG. 5A and FIG. 5B are not identical. In FIG. 5A the lengths of the fingers are held substantially straight so that the fingertips are not all mutually in contact, while in FIG. 5B the fingers are bent so that all three fingertips mutually contact one another.

Other variations likewise may be possible, whether from one stimulus definition to another or even for a single stimulus definition.

Figure 5D:
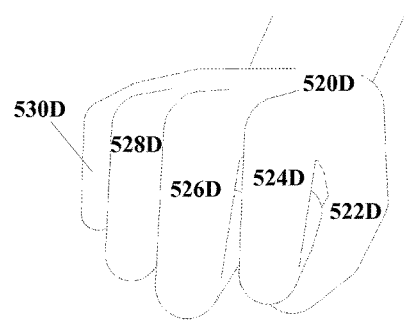
FIG. 5D shows a view of an initial portion of another example embodiment of a hand gesture for calling an interface within an interactive environment, according to the disclosed technique.

In addition, although initial pinch postures are shown in FIG. 5A and FIG. 5B, other initial postures may be equally suitable, including but not limited to a clenched fist. Such an initial posture is shown in FIG. 5D, wherein a hand 520D is illustrated with fingers thereof 522D, 524D, 526D, 528D, and 530D substantially clenched together.

In addition, it may be suitable for some embodiments to define a stimulus in such fashion as to require a transition to a posture with at least three fingers substantially extended and at least partially separated, without necessarily specifying a particular initial posture so that any hand transition terminating in (or for other embodiments passing through) a posture with at least three fingers substantially extended and at least partially separated would be considered to fulfill the definition.

Figure 6:
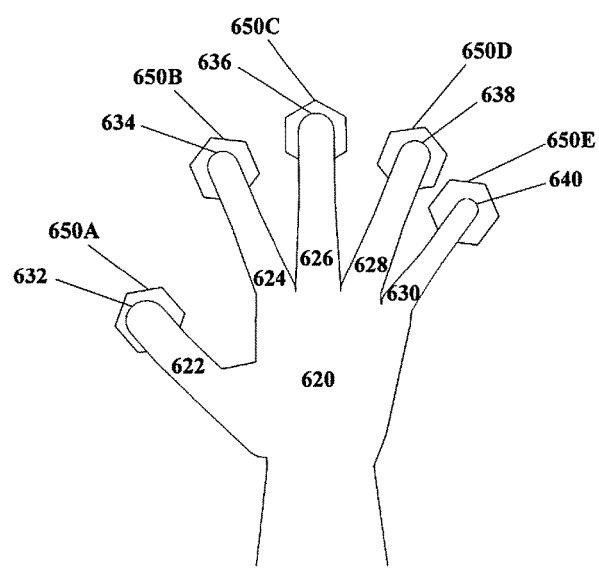
FIG. 6 shows a hand with an example embodiment of an interface according to the disclosed technique with manipulation sites aligned with the fingertips.

Turning to FIG. 6, therein a hand 620 is shown, in a posture with digits 622, 624, 626, 628, and 630 substantially extended and at least partially spread such that the tips thereof 632, 634, 636, 638, and 640 are separated. The posture shown in FIG. 6 is at least somewhat similar to that in FIG. 4A.

In addition, FIG. 6 shows an example embodiment of an interface, which in the embodiment illustrated includes manipulation sites 650A, 650B, 650C, 650D, and 650E. As may be seen, the interface is disposed proximate the stimulus (for this embodiment, the hand 620 in the posture as shown), in the case illustrated such that the manipulation sites 650A, 650B, 650C, 650D, and 650E are substantially aligned with the fingertips 632, 634, 636, 638, and 640 (though such alignment is not required).

Figure 7:
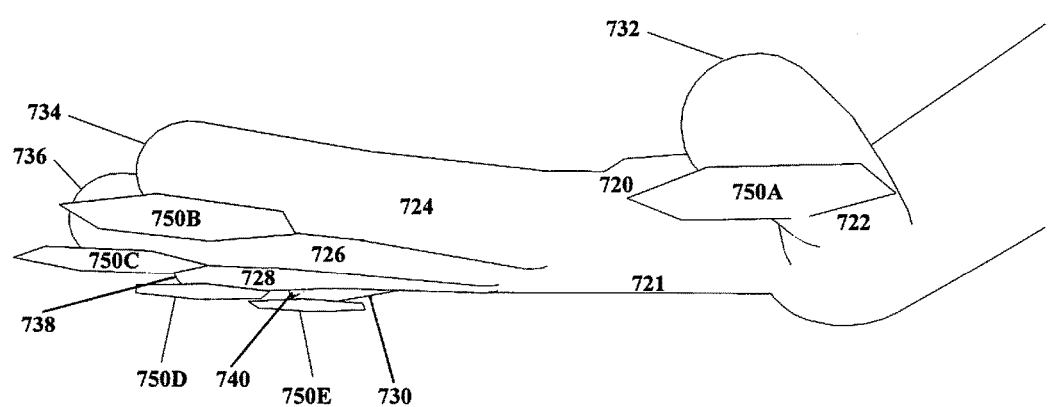
FIG. 7 shows a low perspective view of a hand with an example embodiment of an interface according to the disclosed technique with manipulation sites aligned with the fingertips.

FIG. 7 shows a similar arrangement to that in FIG. 6, but from a different perspective. A hand 720 is shown in a posture with digits 722, 724, 726, 728, and 730 substantially extended and at least partially spread such that the tips thereof 732, 734, 736, 738, and 740 are separated. An interface having manipulation sites is disposed proximate the stimulus (the hand 720 in the posture as shown) such that the manipulation sites 750A, 750B, 750C, 750D, and 750E are substantially aligned with the fingertips 732, 734, 736, 738, and 740.

In addition, as may be seen in FIG. 7 the manipulation sites 750A, 750B, 750C, 750D, and 750E are disposed in front of the hand 720, that is, are on the palm-ward side of the hand 720. It will be understood that in practice the hand 720 or other stimulus is not limited in position or orientation, so in terms of an absolute coordinate system the manipulation sites 750A, 750B, 750C, 750D, and 750E might be above, below, to one side, etc. The phrase "in front of the hand" refers to the position of the manipulation sites 750A, 750B, 750C, 750D, and 750E relative to the hand, rather than referring to an absolute coordinate system. Furthermore, it is noted that the interface and/or the manipulation sites thereof 750A, 750B, 750C, 750D, and 750E are not limited only to being positioned in front of the hand 720.

Furthermore, it may be seen from FIG. 7 that the manipulation sites 750A, 750B, 750C, 750D, and 750E are in contact with the digits 722, 724, 726, 728, and 730, and in particular with the tips thereof 732, 734, 736, 738, and 740.

As may also be seen by visual examination of FIG. 7, the manipulation sites 750A, 750B, 750C, 750D, and 750E are disposed substantially in a plane, that plane being substantially aligned with a surface of the fingertips 732, 734, 736, 738, and 740 of the hand 720 in the configuration shown. As may also be seen, the plane of the manipulation sites 750A, 750B, 750C, 750D, and 750E is also substantially aligned with the palm 721 of the hand 720 in the configuration illustrated.

For at least certain embodiments, arrangements as illustrated in FIG. 6 and/or FIG. 7 may be advantageous. In outputting an interface proximate the stimulus—in the case shown in FIG. 6 disposing manipulation sites 650A, 650B, 650C, 650D, and 650E proximate the fingertips 632, 634, 636, 638, and 640 of the hand 620—the interface is readily available for manipulation by the user. That is, the user may for example execute the proper gesture (posture, other stimulus, etc.) with the interface appearing where the gesture terminates. The user need not then search for an interface, determine how to call up an interface, reach for an interface, reposition an interface, etc.; the interface appears on command at the point that the stimulus is applied.

In particular, an arrangement wherein the stimulus is substantially uniform throughout the system in question, and wherein likewise the interface appears in response thereto in a substantially similar fashion, may be useful. In such cases the user is not required to learn multiple gestures, commands, or other stimuli unique to different programs, settings, conditions, etc. Rather, the user may utilize a stimulus that is substantially identical for substantially all times, places and/or conditions within a given environment (or even within multiple such environments), with the steps of generating and outputting the interface in response to the stimulus being executed at substantially all times, in substantially all places, and/or under substantially all conditions within the environment.

However, it is noted that the existence of a single stimulus does not necessarily limit the disclosed technique to a single interface. For at least certain embodiments, the content, configuration, etc. of an interface may vary depending on conditions, even if the stimulus is uniform throughout the system.

In FIGS. 6 and 7 the interfaces illustrated are graphical in nature, having manipulation sites 650A, 650B, 650C, 650D, and 650E and 750A, 750B, 750C, 750D, and 750E shown as contact sites, i.e. as "buttons" or "keys" that may be touched by a user to enter inputs. However, this is an example only. Other arrangements for manipulation sites may be equally suitable, including but not limited to full or partial alphanumeric keyboards, sliders, dials, or augment/virtual analogs of physical objects such as a virtual joystick, etc. The use of non-graphical interfaces may also be suitable, for example (as noted earlier) the use of voice commands, or the acceptance of gestures without an obvious graphical structure to serve as an interface. In addition, interfaces other than manipulation sites may also be suitable, such as a visual target associated with eye tracking, etc.

Referring again to FIG. 6, where manipulation sites 650A, 650B, 650C, 650D, and 650E are utilized, it may be useful for at least some embodiments to define (e.g. within a processor such as that referred to with respect to FIG. 1 and/or FIG. 2) an input manipulation associated for each manipulation site 650A, 650B, 650C, 650D, and 650E. While physical interfaces typically have input functions based on physical structure—buttons accept inputs by pressing, dials by rotating, etc.—augmented and/or virtual reality interfaces and manipulation sites thereof may have no physical substance, and thus may not be limited to "physically" natural manipulation or input related thereto. In defining an input manipulation, the manipulation sites 650A, 650B, 650C, 650D, and 650E are essentially being told "how to work". That is, a virtual/augment touch pad is pressed, a virtual/augment dial is twisted, etc. It is noted that virtual/augment manipulation sites may have multiple input manipulations, i.e. a key might be pressed and/or might be rotated, "crushed" between fingers, etc.

Likewise, it may be useful to define (e.g. within a processor such as that referred to with respect to FIG. 1 and/or FIG. 2) an input for each input manipulation and/or manipulation site 650A, 650B, 650C, 650D, and 650E. Again, while physical interfaces may be fixed in their inputs by structure—for example an alphanumeric keyboard may be constructed so that pressing the "E" key necessarily inputs a signal representing the character "E"—augmented and/or virtual reality interfaces may not be so limited. In defining an input associated with an input manipulation, the manipulation sites 650A, 650B, 650C, 650D, and 650E are essentially being told "what to do" when subjected to an input manipulation. That is, pressing a keypad labeled "new file" might open a new file within a currently running program, etc. Individual manipulation sites 650A, 650B, 650C, 650D, and 650E may have multiple inputs associated therewith, for example one input for each input manipulation (i.e. pushing a key sends one input to a processor, crushing the key sends a different input, etc.).

In the arrangement shown in FIG. 6, the manipulation sites 650A, 650B, 650C, 650D and 650E may be seen to be arranged according to the anatomy of the hand 620. That is, individual manipulation sites 650A, 650B, 650C, 650D and 650E appear under each fingertip 632, 634, 636, 638, and 640. However, such an ergonomic arrangement, while potentially useful for at least some embodiments, is an example only, and numerous other arrangements may be equally suitable.

Figure 8:
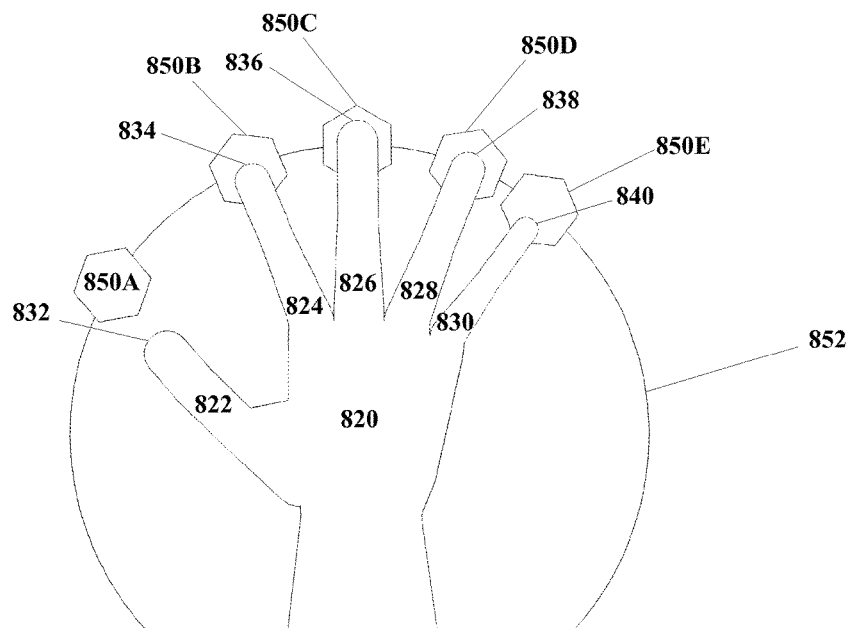
FIG. 8 shows a hand with another example embodiment of an interface according to the disclosed technique with manipulation sites radially aligned with the fingertips.

Referring to FIG. 8, an alternative arrangement similar to that in FIG. 6 but still distinct is shown. In FIG. 8, a hand 820 is shown in a posture with digits 822, 824, 826, 828, and 830 substantially extended and at least partially spread such that the tips thereof 832, 834, 836, 838, and 840 are separated. An interface of manipulation sites 850A, 850B, 850C, 850D, and 850E also is visible, disposed proximate the hand 820 posture (stimulus).

However, unlike the arrangement in FIG. 6, in FIG. 8 the manipulation sites 850A, 850B, 850C, 850D, and 850E are not entirely aligned with the fingertips 832, 834, 836, 838, and 840. Rather, although the manipulation sites 850A, 850B, 850C, 850D, and 850E are substantially aligned with the fingertips 832, 834, 836, 838, and 840 radially, the manipulation sites 850A, 850B, 850C, 850D, and 850E are disposed substantially on a circle 582 that is substantially centered on the hand 820. It is noted that in practice a geometric figure or structure (if any) used to organize an arrangement of manipulation sites 850A, 850B, 850C, 850D, and 850E may not be visible, however, the circle 852 is shown in FIG. 8 for clarity.

Figure 9:
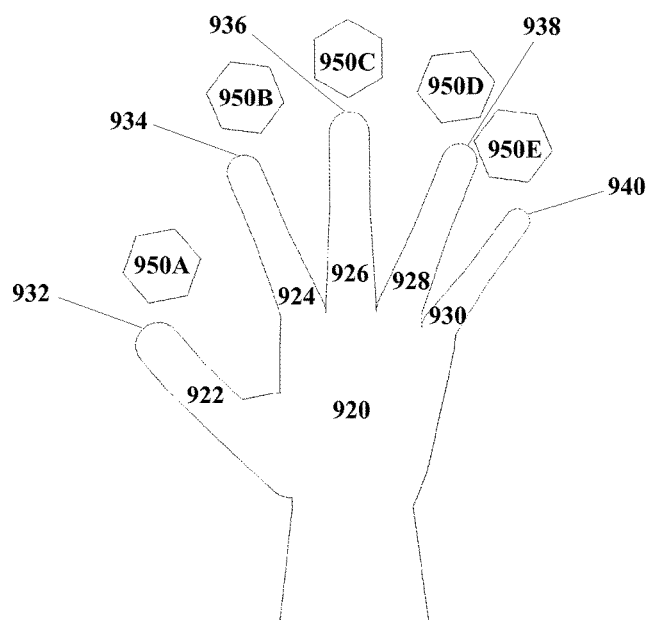
FIG. 9 shows a hand with another example embodiment of an interface according to the disclosed technique with manipulation sites linearly offset from the fingertips.

Turning to FIG. 9, another arrangement is shown with an interface translated/offset slightly from the stimulus. A hand 920 is shown in a posture with digits 922, 924, 926, 928, and 930 substantially extended and at least partially spread such that the tips thereof 932, 934, 936, 938, and 940 are separated. An interface of manipulation sites 950A, 950B, 950C, 950D, and 950E also is visible, disposed proximate the hand 920 posture (stimulus). However, the manipulation sites 950A, 950B, 950C, 950D, and 950E, while proximate the hand 920, are translated a short linear distance away from the fingertips 932, 934, 936, 938, and 940 (in the example as illustrated, upwards on the page).

Figure 10:
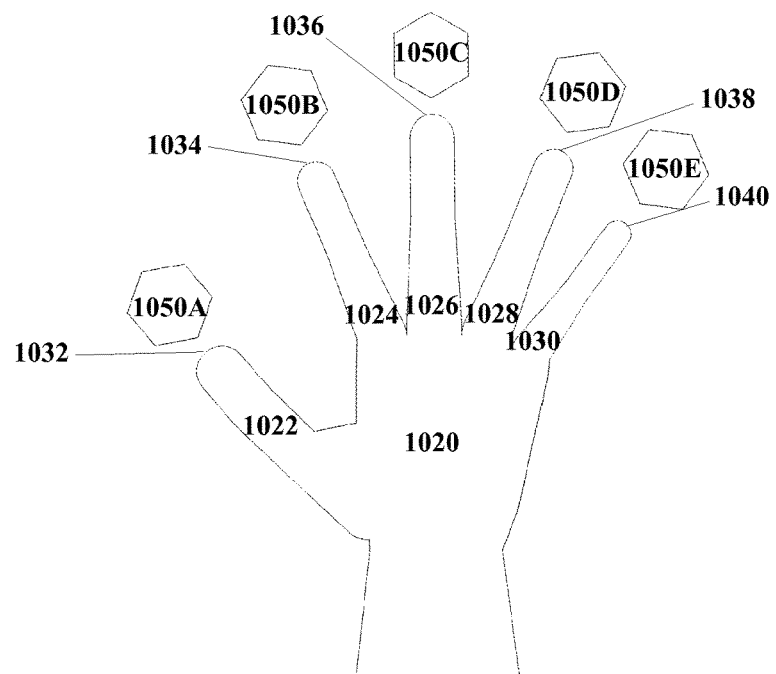
FIG. 10 shows a hand with another example embodiment of an interface according to the disclosed technique with manipulation sites radially offset from the fingertips.

In FIG. 10, another arrangement is shown with an interface radially displaced from the stimulus. A hand 1020 is shown in a posture with digits 1022, 1024, 1026, 1028, and 1030 substantially extended and at least partially spread such that the tips thereof 1032, 1034, 1036, 1038, and 1040 are separated. An interface of manipulation sites 1050A, 1050B, 1050C, 1050D, and 1050E also is visible, disposed proximate the hand 1020 posture (stimulus). However, the manipulation sites 1050A, 1050B, 1050C, 1050D, and 1050E, while proximate the hand 1020, are offset a short radial distance away from the fingertips 1032, 1034, 1036, 1038, and 1040 (in the example as illustrated, radially outward).

Figure 11:
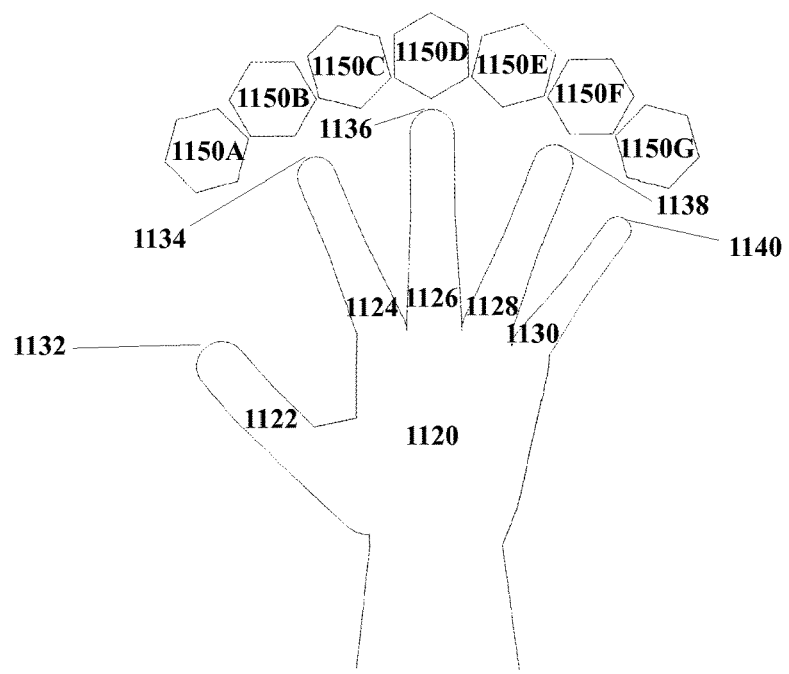
FIG. 11 shows a hand with another example embodiment of an interface according to the disclosed technique with manipulation sites in a partial ring.

FIG. 11 shows yet another arrangement for an interface. A hand 1120 is shown in a posture with digits 1122, 1124, 1126, 1128, and 1130 substantially extended and at least partially spread such that the tips thereof 1132, 1134, 1136, 1138, and 1140 are separated. An interface of manipulation sites 1150A, 1150B, 1150C, 1150D, 1150E, 1150F, and 1150G also is visible, disposed proximate the hand 1120 posture (stimulus). As may be seen, the manipulation sites 1150A through 1150G form a partial ring that substantially circumscribes the hand 1120 (or that might be considered to partially circumscribe a portion of the hand 1120).

It is noted that the manipulation sites 1150A through 1150G total seven in number, different from the number of digits 1122, 1124, 1126, 1128, and 1130. While for at least some embodiments it may be convenient to generate an interface with manipulation points equal in number and substantially similar in position and/or arrangement to the digits 1122, 1124, 1126, 1128, and 1130 of a human hand, this is an example only. As may be seen from FIG. 11, interfaces with more or fewer manipulation points may be equally suitable, and interfaces arranged differently from a human hand may also be equally suitable.

Figure 12:
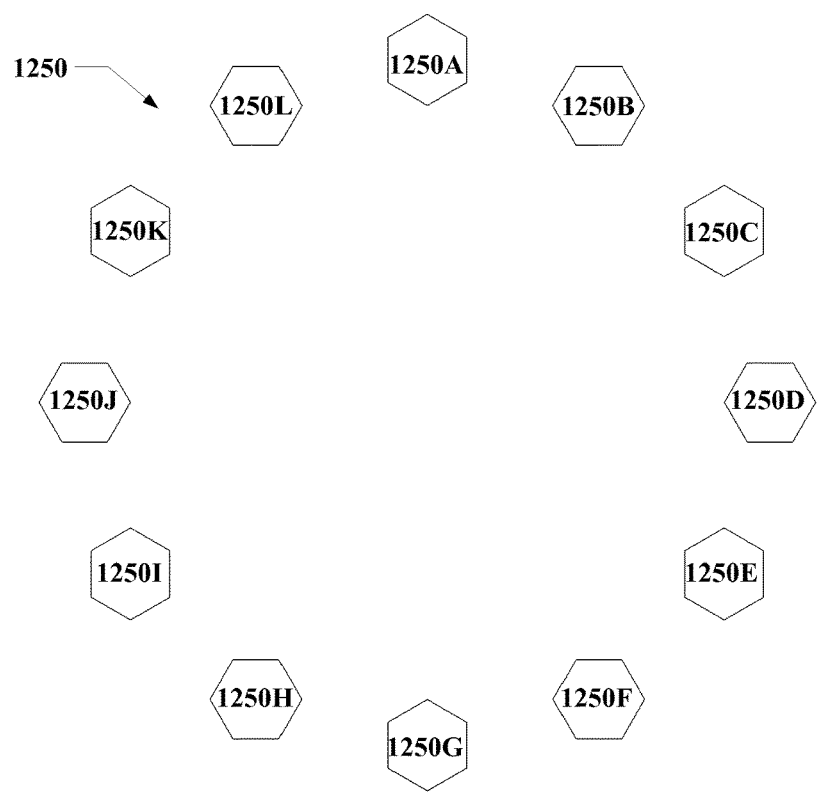
FIG. 12 shows an example embodiment of an interface according to the disclosed technique with discrete manipulation sites in a full ring.

FIG. 12 shows another arrangement of an interface. For clarity, a hand gesture or other stimulus is not shown therein. In practice the interface typically would be outputted proximate the hand gesture or other stimulus, however the interface is not necessarily bound to the hand once outputted, i.e. if the hand moves away from the location at which the interface was outputted the interface will not necessarily move with the hand (although moving with the hand also is not excluded).

In addition, the disclosed technique is not limited only to stimuli and/or other inputs using hand gestures, even for embodiments that may rely upon gestures and/or body motions. That is, a gestural stimulus to call an interface, and/or an input manipulation to apply inputs using an interface, is not necessarily limited only to application by hands, fingertips, etc. Other suitable arrangements might include but are not limited to stimuli and/or inputs with feet, knees and/or elbows, head, nose, or even tongue, and/or more large-scale body gestures such as stances, kicks or punches, or even dance steps.

In FIG. 12, an interface 1250 is shown. The interface 1250 as illustrated includes a total of twelve manipulation sites 1250A through 1250L. As may be seen, the interface 1250 is arranged substantially as a ring of discrete manipulation sites 1250A through 1250L, disposed substantially in a ring.

Figure 13:
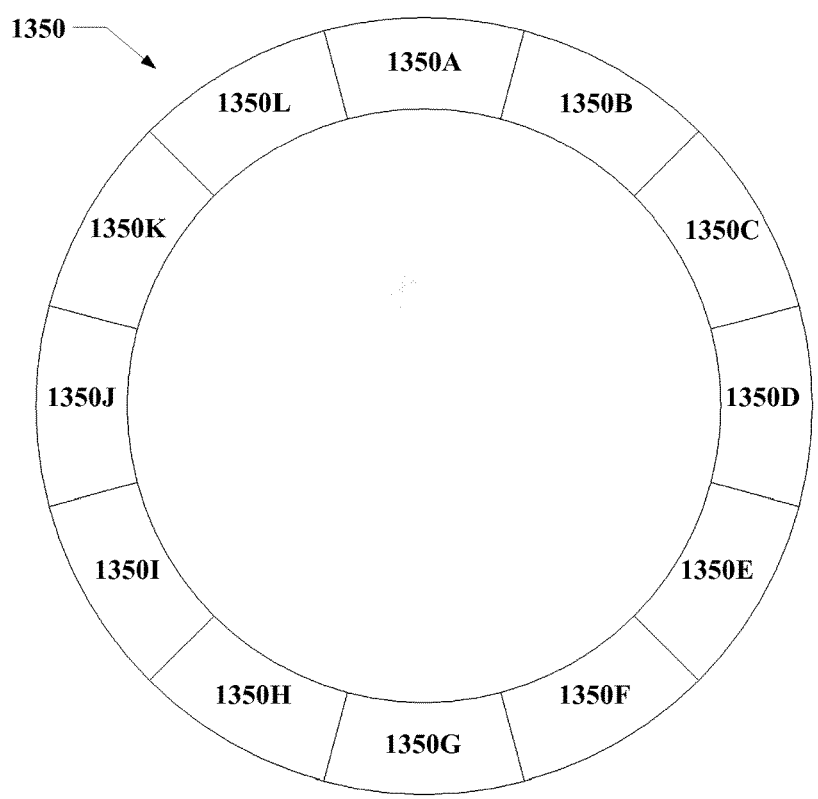
FIG. 13 shows an example embodiment of an interface according to the disclosed technique with continuous manipulation sites in a full ring.

In FIG. 13 another interface 1350 is shown. The interface as illustrated includes a total of twelve manipulation sites 1350A through 1350L. As may be seen, the interface 1350 is arranged substantially as a ring of discrete manipulation sites 1350A through 1350L, disposed in a ring. While the gross structure of the interface 1350 is at least somewhat similar to that shown in FIG. 12, in the example embodiment shown in FIG. 13 the interface 1350 is configured with manipulation sites 1350A through 1350L disposed substantially adjacent to one another, such that the interface 1350 is substantially a continuous ring.

Figure 14:
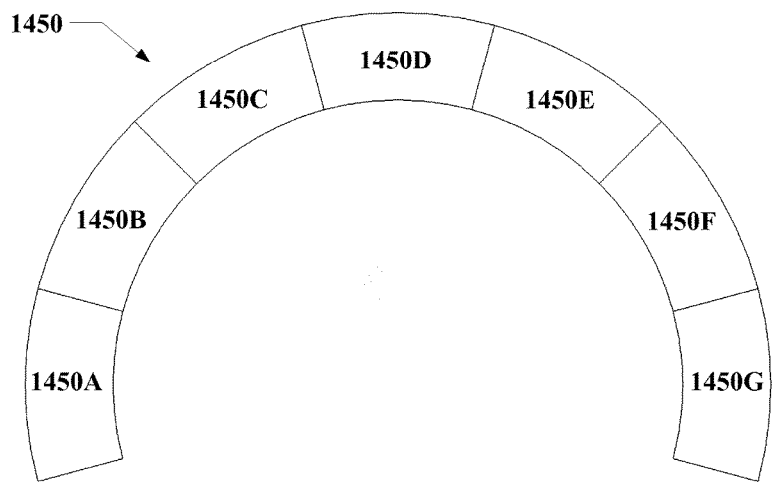
FIG. 14 shows an example embodiment of an interface according to the disclosed technique with continuous manipulation sites in a partial ring.

FIG. 14 also shows an interface 1450 with a substantially continuous structure thereto, with manipulation sites 1450A through 1450G. However, as may be seen the interface 1450 in FIG. 14 is arranged in a partial ring only.

Figure 15:
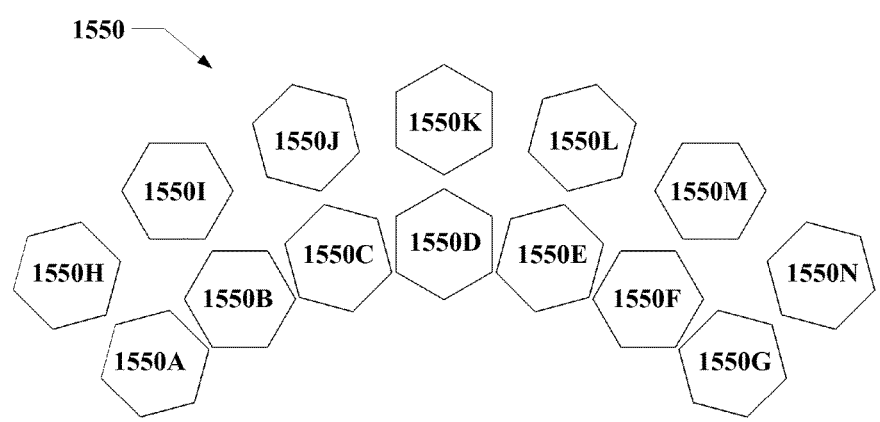
FIG. 15 shows an example embodiment of an interface according to the disclosed technique with manipulation sites in two concentric partial rings.

FIG. 15 shows yet another interface 1550. In the arrangement shown in FIG. 15, the interface 1550 includes manipulation sites 1550A through 1550N. The manipulation sites 1550A through 1550N therein are arranged substantially in two partial rings, the rings being substantially concentric with manipulation sites 1550A through 1550G being disposed in a partial inner ring and manipulation sites 1550H through 1550N being disposed in a partial outer ring.

Figure 16:
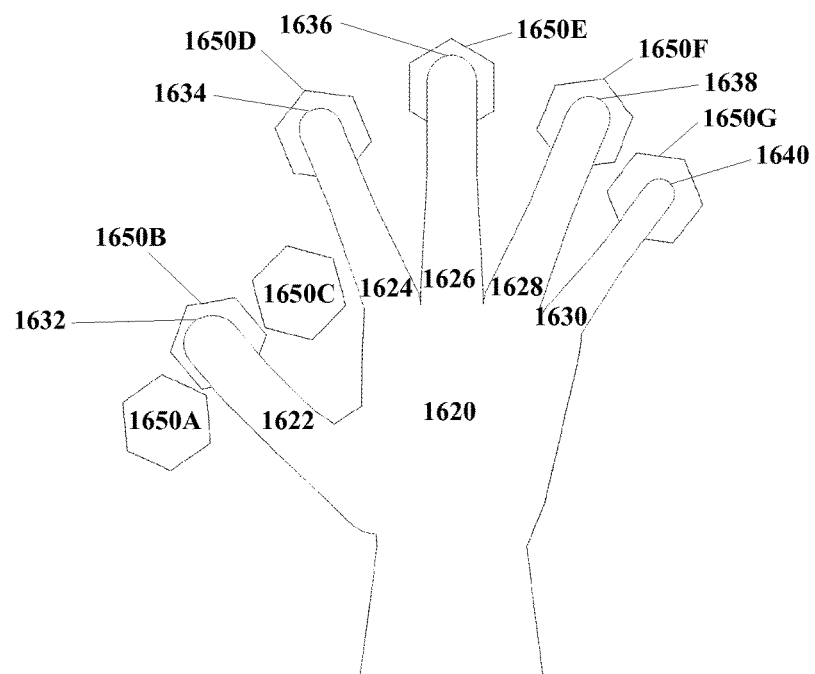
FIG. 16 shows an example embodiment of an interface according to the disclosed technique with multiple manipulation sites for one digit.

Turning to FIG. 16, therein an interface is shown having manipulation sites 1650A through 1650G. A hand 1620 is again illustrated for reasons that will shortly be described. The hand 1620 is shown in a posture with digits 1622, 1624, 1626, 1628, and 1630 substantially extended and at least partially spread such that the tips thereof 1632, 1634, 1636, 1638, and 1640 are separated. Some of the individual manipulation sites—specifically 1650B, 1650D, and 1650E, 1650F, and 1650G are disposed aligned with the fingertips 1632, 1634, 1636, 1638, and 1640 in an arrangement at least somewhat similar to that shown in FIG. 6.

However, as may be seen FIG. 16 also shows two additional manipulation sites 1650A and 1650C to the left and right of the thumb 1622. These manipulation sites 1650A and 1650C are positioned such that a user might readily move his or her thumb 1622 to reach and manipulate the manipulation sites 1650A and 1650C in an ergonomically efficient manner. As has previously been shown, certain embodiments of the disclosed technique may include the presence of more manipulation sites than fingers. As shown in FIG. 16, for at least some embodiments of the disclosed technique it may be useful to dispose manipulation sites such as 1650A, 1650B, and 1650C in a fashion as to facilitate the manipulation of multiple sites by a single digit such as 1620.

Figure 17:
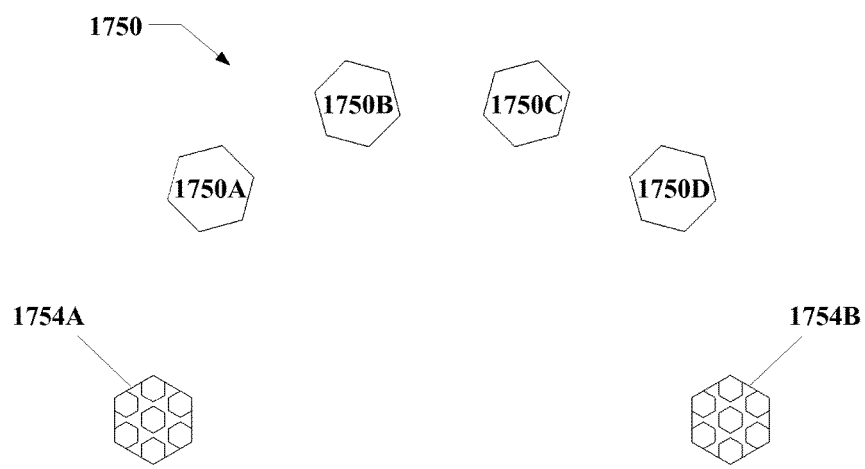
FIG. 17 shows an example embodiment of an interface according to the disclosed technique with inactive manipulation sites.

Moving on to FIG. 17, an interface 1750 utilizing an alternative arrangement for managing manipulation sites is shown therein. In FIG. 17, four manipulation sites 1750A through 1750D are shown as part of the interface 1750. In addition, two icons 1754A and 1754B each representing one or more additional inactive manipulation sites are shown as part of the interface 1750.

In general for the disclosed technique, it is not required for all manipulation sites in an interface to be active at all times. For example, a manipulation site that instructs a processor to open a new file in a currently running program may be inactive while no programs are running that would support the creation of such a new file. Under such circumstances the relevant manipulation site might for some embodiments be removed from the interface, rendered invisible, etc. For other embodiments, an inactive manipulation site might be present but distinguished as inactive in some fashion, e.g. grayed out, a different color, reduced in size, positioned off to one side of the active manipulation sites, etc. However, not all icons or other entities that are grayed out, changed in color, reduced in size, offset to one side, etc. will necessarily represent inactive manipulation points, nor will all inactive manipulation points necessarily be represented by such features.

Thus, an active condition may be defined for manipulation sites wherein the manipulation site applies its input(s) to a processor when an input manipulation (as previously described) is applied thereto. Likewise, an inactive condition may be defined for manipulation sites wherein the manipulation site does not apply its input(s) to the processor even if the input manipulation is applied thereto while in the inactive condition.

One approach for distinguishing inactive manipulation sites from active manipulation sites is illustrated in FIG. 17. Therein, the icons 1754A and 1754B each represent, as stated, one or more inactive manipulation sites within the interface 1750. Such an arrangement might be used, for example, if an interface includes an inconveniently large number of possible manipulation sites. Rather than output an interface that is increasingly complex as the number of options increases, some of the manipulation sites might be displayed as active while other manipulation sites (e.g. manipulation sites that are less often used) may be grouped together and shown as available but not currently active, as by displaying icons 1754A and 1754B. Through some manipulation, the icons 1754A and 1754B may be opened, activated, etc. so as to allow access to the manipulation sites therein (described in more detail with regard to FIG. 18A and FIG. 18B).

Figure 18A:
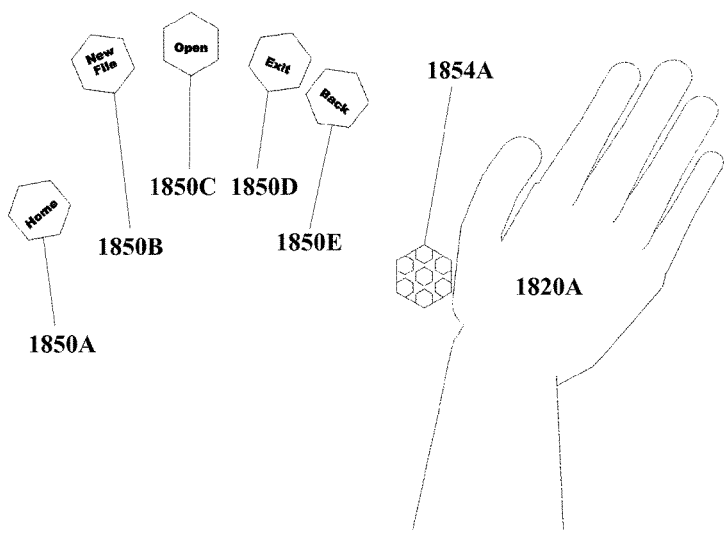
FIG. 18A shows an example embodiment of an interface according to the disclosed technique with inactive manipulation sites and an initial portion of an example embodiment of a hand gesture for calling moving manipulation sites between active and inactive, according to the disclosed technique.

Turning now to FIG. 18A, an arrangement is shown with a hand 1820A therein, five active manipulation sites 1850A through 1850E, and an icon 1854A representing one or more inactive manipulation sites. As may be seen, the active manipulation sites 1850 through 1850E are each labeled: "Home", "New File", "Open", "Exit", and "Back" respectively. This feature will be further addressed below.

Figure 18B:
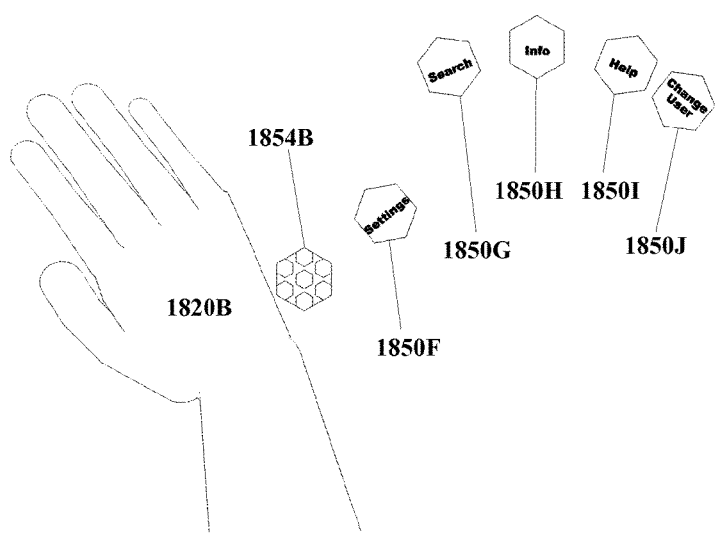
FIG. 18B shows an example embodiment of an interface according to the disclosed technique with inactive manipulation sites and a terminal portion of an example embodiment of a hand gesture for calling moving manipulation sites between active and inactive, according to the disclosed technique.

In order to move manipulation sites between an active and an inactive condition, it may be advantageous for at least some embodiments to define one or more switch manipulations. A switch manipulation might, for example, toggle a manipulation site or group of manipulation sites between their active and inactive conditions. This approach is shown in FIG. 18A and FIG. 18B. However, it is an example only, and other arrangements may be equally suitable. For example, for some embodiments, it may be useful to define first and second switch manipulations, a first switch manipulation to inactivate an active manipulation site and the second manipulation to activate an inactive manipulation site.

Returning to FIG. 18A, it can be seen that the hand 1820A is to the right of the interface, and that the hand 1820A is tilted to the right from the wrist thereof. For a switch manipulation defined as a gesture, the configuration of the hand 1820A in FIG. 18A may be considered to be an initial portion of a dynamic switch manipulation gesture.

Turning to FIG. 18B, a terminal portion of the switch manipulation gesture may be seen therein. The hand 1820B as shown has moved to the left of the interface, the user having executed a "swipe" gesture. Such a gesture is an example only, and other gestures, postures, and/or other stimuli may be equally suitable for switching manipulation sites between active and inactive conditions.

As in FIG. 18A, in FIG. 18B five manipulation sites 1850F through 1850J are shown therein. Manipulation sites 1850F through 1850J are in a configuration similar to that of manipulation sites 1850A through 1850E in FIG. 18A. However, it will be observed that the manipulation sites in FIG. 18B are distinct from the manipulation sites in FIG. 18A, at least insofar as the markings thereon. In FIG. 18B, manipulation sites 1850F through 1850J are labeled "Settings", "Search", "Info", "Help", and "Change User" respectively. In addition, icon 1854A is no longer displayed in FIG. 18B, while icon 1854B is displayed in FIG. 18B, and in a different position than was occupied by icon 1854A in FIG. 18A.

From a user point of view, the switch manipulation in FIG. 18A and FIG. 18B has effectively swept the manipulation sites that were active in FIG. 18 A —1850A through 1850E—into icon 1854B as inactive sites. In addition, the switch manipulation has swept the formerly inactive manipulation sites that were in icon 1854A into active condition as displayed in FIG. 18B. It will be understood that no physical "sweeping" or change is required for the disclosed technique, given that virtual/augment constructs (i.e. the manipulation sites as shown) have no physical substance to "sweep". Rather, an appearance of such a transformation is produced and outputted to the user, and the functional effect of such a change is observed from the standpoint of the user.

While the arrangement shown in FIG. 18A and FIG. 18B shows only a single icon at a time (1854A or 1854B) and only two "screens" of manipulation sites, this is an example only. If, for example, an interface included sufficient manipulation sites, it might be possible for some embodiments to sweep (or otherwise execute a switch manipulation) through many screens of active manipulation sites. Depending on the embodiment, each screen or group of manipulation sites may be represented by its own icon, a single icon may be used to represent an arbitrarily large number of manipulation sites, or some other arrangement may be implemented. For example, a continuum of inactive manipulation sites (whether shown individually or grouped together) might extend outward to one side, in a full or partial ring, or even in some more complex structure such as a three dimensional helix. The disclosed technique is not particularly limited with regard to such matters.

Another feature suitable for at least some embodiments of the disclosed technique visible in FIG. 18A and FIG. 18B is the presence of text markings on the manipulation sites 1850A through 1850J. Text markings, while potentially useful e.g. for identifying the function of different portions of the interface (including but not limited to manipulation sites), providing instructions for using the interface, etc., are not required. Furthermore, although text is shown on manipulation sites 1850A through 1850J in FIG. 18A and FIG. 18B, text is not limited only to manipulation sites, and may appear elsewhere. Likewise, additional graphical features and/or other outputs may be part of an interface according to the disclosed technique.

FIG. 18A and FIG. 18B show icons 1854A and 1854B respectively that represent groups of one or more inactive manipulation sites. For certain embodiments of the disclosed technique, it may be useful to use group manipulation sites and/or other features collectively into representative icons for purposes other than distinguishing active versus inactive configuration.

Referring to FIG. 23A, an interface 2350A is shown therein, including manipulation sites 2350A-A, 2350A-B, 2350A-C, 2350A-D, 2350A-E, and 2350A-F.

FIG. 23B shows an interface similar to FIG. 23A, but after one of the manipulation sites, specifically manipulation site 2350A-A, has been used for input (e.g. for a touch key the site 2350A-A has been touched). In response the interface has changed from the appearance 2350A shown in FIG. 23A to the appearance 2350B shown in FIG. 23B. In particular, a new group of manipulation sites —2350B-AA, 2350B-AB, 2350B-AC, 2350B-AD, 2350B-AE, and 2350B-AF— have expanded out of manipulation site 2350A-A in FIG. 23A.

In addition, a new icon 2351B-A appears in FIG. 23B, also in response to the input applied to manipulation site 2350A-A in FIG. 23A. As new manipulation sites 2350B-AA, 2350B-AB, 2350B-AC, 2350B-AD, 2350B-AE, and 2350B-AF in FIG. 23B expanded out of manipulation site 2350A-A in FIG. 23A, manipulation sites 2350A-A, 2350A-B, 2350A-C, 2350A-D, 2350A-E, and 2350A-F in FIG. 23A collapsed into icon 2351B-A.

In plain terms, it may be considered that a user opened a manipulation site in FIG. 23A (2350A-A), that action opening a new set of manipulation sites formerly therein as shown in FIG. 23B, with that action also collapsing the original set of manipulation sites from FIG. 23A into an icon in FIG. 23B (2351B-A). Essentially, the original interface 2350A in FIG. 23A may be considered to have nested levels therein, with the higher level interface shown in FIG. 23B as icon 2351B-A. For at least certain embodiments, manipulating icon 2351B-A may reverse the process, returning the interface to the configuration shown in FIG. 23A.

Not all icons or manipulation sites will necessarily have a nested group of additional manipulation sites and/or icons (and/or other features, information, etc.) therein. Some manipulation sites may execute individual inputs, or perform other functions. However, an arrangement of nested interface levels may be advantageous for at least some embodiments, for example allowing convenient to large numbers of manipulation sites, other features, information, etc. in an organized tree of groups. However, the use of nesting may is an example only, and is not required.

Nesting may include multiple levels. This might be considered analogous to cosmic structures, i.e. starting with a galaxy it is possible to "zoom in" on one star system, from a star system to a planet, from a planet to a moon thereof, etc. Such an additional nested step is shown in FIG. 23C.

FIG. 23C shows an interface similar to FIG. 23B, but after manipulation site 2350B-AC has been used for input. In response the interface has changed from the appearance 2350B shown in FIG. 23B to the appearance 2350C shown in FIG. 23C. In particular, a new group of manipulation sites —2350C-ACA, 2350C-ACB, 2350C-ACC, 2350C-ACD, 2350C-ACE, and 2350C-ACF—have expanded out of manipulation site 2350C-AC in FIG. 23B. In addition, a new icon 2351C-AC appears in FIG. 23C, also in response to the input applied to manipulation site 2350A-AC in FIG. 23B. Manipulation sites 2350B-AA, 2350B-AB, 2350B-AC, 2350B-AD, 2350B-AE, and 2350B-AF in FIG. 23A collapsed into icon 2351C-AC. The arrangement in FIG. 23C thus shows an interface on a third level of depth, counting the arrangement in FIG. 23A as a first level and the arrangement in FIG. 23B as a second level.

As previously described, for at least certain embodiments of the disclosed technique it may be advantageous if the stimulus for calling an interface is substantially the same at all times, in all places, and/or under all conditions throughout the environment. However, this does not necessarily imply that the interface itself must be substantially identical. An interface may vary in many aspects.

For example, what is the overall functionality of the interface? Is the interface a graphical interface, a command interface, etc.? Does the interface respond to gestures, to voice commands, to manipulation of virtual/augment objects, and/or to other inputs? Does the interface use manipulation sites? If so, are active and inactive conditions defined for the manipulation sites?

The type and function of manipulation sites (if present) may also vary. For example, are manipulation sites touch keys, sliders, three dimensional virtual/augment objects that are manipulated, etc.? Likewise, the number and arrangement of manipulation sites may vary, e.g. being arranged so as to form a five-site ergonomic interface (and/or tailored to the specific ergonomics of individual users), or to form a full or partial ring, or multiple nested or non-nested rings, etc. Is the interface designed for manipulation with one hand (as illustrated herein, simplicity) or for two, for example with two sets of manipulation sites in two groups (one for each hand), or as a single two-handed interface (e.g. a QWERTY keyboard)?

The behavior of the interface also may vary. For example, does the interface follow the user's hand once outputted, remain in the user's field of view, or remain static? Does the interface remain until dismissed or disappear after some time, and if so how much time elapses before the interface disappears? Does the interface adjust color or brightness in response to local conditions within the environment?

Numerous other features of the interface may vary, and the disclosed technique is not limited only to variations in the aforementioned features.

In addition, the interface may be self-adjusting based on context. For example, an interface may vary in response to the status of the environment, the conditions therein, the actions of the user, etc. It is emphasized that context adjustment and other variations are not limited only to determining the properties of the interface when the stimulus is applied, and/or when the interface is outputted. Rather, the properties of the interface may also change over time while the interface is extant, reconfiguring or otherwise changing based on user actions, context, etc. Relevant context factors to which the interface may respond by adjusting the content and/or configuration thereof may include, but are not limited to:

a. Status of the environment, either when the stimulus is applied or otherwise. For example, is the environment "locked"? What programs (if any) are running? If the environment supports multiple users how many users are present?

b. Content of the environment, either when the stimulus is applied or otherwise. For example, in a virtual/augmented reality environment, what virtual, augmented, and/or real world objects are present?

c. Location of the interface and/or the user within the environment, either when the stimulus is applied or otherwise.

d. Location of the environment, either when the stimulus is applied or otherwise. That is, where is the environment within the real world (or within some other larger encompassing environment)? This might include local considerations such as whether the environment is indoors or outdoors, and/or broader considerations such as what political nation or state the environment might be located in.

e. Time, such as time of day, day of the week, month, year, etc.

f. Conditions within the environment, either when the stimulus is applied or otherwise. For example, what is the ambient light level within the environment?

g. Conditions external to the environment, either when the stimulus is applied or otherwise. For example, what level of external connectivity (e.g. wifi or other data bandwidth) exists? Are there people, objects, etc. nearby but not necessarily within the environment?

h. Identity of the user. In particular, is the user recognized, authorized, a guest, etc.?

i. Condition of the user, either when the stimulus is applied or otherwise. For example, is the user standing, sitting, using their right or left hand to deliver gestures, carrying objects, wearing clothing of a particular color or style, etc.?

j. Non-input behavior of the user. For example, is the user walking, driving a vehicle, speaking to another person, etc.? (It will be understood that behavior constituting deliberate inputs by the user, may also affect the content and/or configuration of the environment.)

Figure 19:
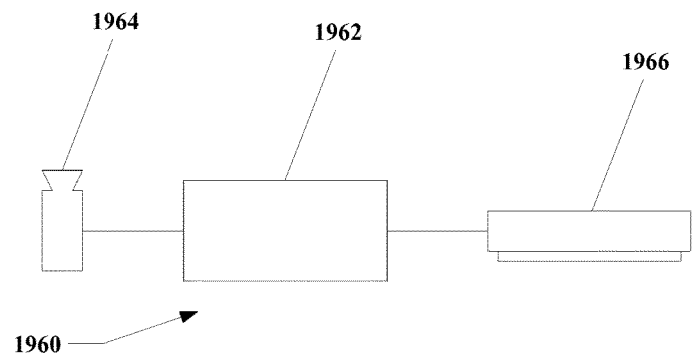
FIG. 19 shows an example embodiment of an apparatus for generating an interface according to the disclosed technique.

Turning now to FIG. 19, a schematic arrangement is shown therein for an example embodiment of an apparatus 1960 according to the disclosed technique. The apparatus 1960 as illustrated in FIG. 19 includes a processor 1962, a sensor 1964 in communication with the processor 1962, and a display 1966 also in communication with the processor 1962.

The processor 1962 is adapted to define a stimulus in the form of a gesture or posture with end-effector including but not limited to a user's hand. The processor 1962 is also adapted to generate a user interface in response to the stimulus. The sensor 1964 is adapted to sense the stimulus. The display 1966 is adapted to output the user interface within an environment such as a three dimensional environment (including but not limited to virtual or augmented reality environments).

A range of general-purpose, special-purpose, and embedded systems may be suitable for use as the processor 1962. Moreover, it may be equally suitable for the processor 1962 to consist of two or more physical or logical processor components.

In some embodiments, executable instructions may be instantiated on the processor 1962 for carrying out the functions of the disclosed technique. For example, with reference also to FIG. 1, executable instructions may be instantiated on the processor 1962 for steps that might include but are not limited to defining the stimulus 102 and/or generating the interface 108. The use of executable instructions instantiated on the processor 1962 does not exclude the possibility of other executable instructions being instantiated thereon, in addition to or in place of those for steps 102 and/or 108 of FIG. 1, and whether or not the executable instructions relate to the disclosed technique or not.

More particularly, for some embodiments it may be useful for executable instructions for carrying out steps 102, 108 and/or other actions are incorporated within an operating system instantiated on the processor 1962. Such use within an operating system may be advantageous, for example so as to support the use of a substantially uniform stimulus throughout the environment (or at least those portions of the environment controlled by the processor 1962 in question) without requiring each program, virtual or augmented reality object, etc. within the environment to include capabilities for supporting an interface according to the disclosed technique. Incorporating executable instructions relating to the disclosed technique into an operating system also might be useful in arranging for synching programs, objects, etc. that do individually include capabilities for supporting an interface according to the disclosed technique so as to respond to a substantially uniform stimulus throughout the environment.

A range of devices may be suitable for use as the sensor 1964. As illustrated in FIG. 19, the sensor 1964 is shown with the outline of a compact digital camera, adapted to capture images and/or video, but this is an example only. A range of cameras, including but not limited to CMOS and CCD cameras, may be suitable. Moreover, sensors other than cameras likewise may be equally suitable, and sensors that capture information other than images and/or video may be equally suitable. For certain embodiments, the sensor 1964 may be adapted to sense the position and/or the orientation of the stimulus (e.g. a hand posture or hand gesture) in three dimensional space, but this also is an example only and is not required.

A range of devices also may be suitable for use as the display 1966, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable.

Figure 20:
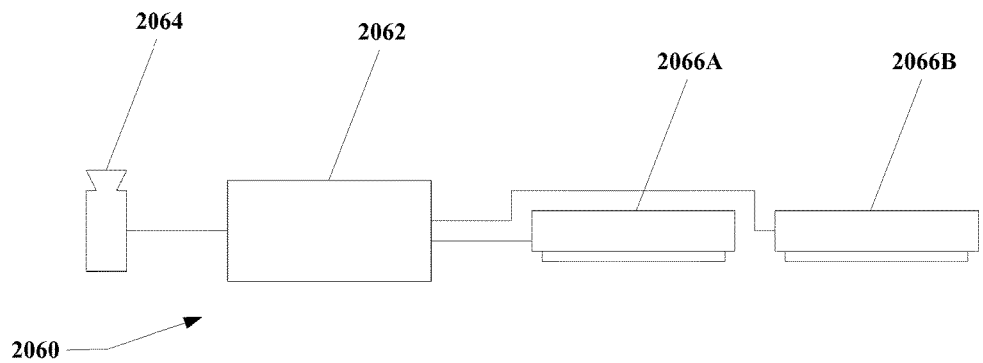
FIG. 20 shows another example embodiment of an apparatus for generating an interface according to the disclosed technique, having dual displays.

Now with reference to FIG. 20, an arrangement is shown therein of an apparatus 2060 with a first display 2066A and a second display 2066B. The processor 2062 is adapted to generate an interface in three dimensional space within an environment. The interface may be, but is not required to be, a three dimensional interface. The sensor 2064 is adapted to sense a stimulus delivered within the environment. Such a display arrangement may be useful for some embodiments, for example, in that first and second display 2066A and 2066B may be configured as a stereo system so as to enable the outputting of three dimensional interfaces by outputting slightly different images to the first and second displays 2066A and 2066B, comparable to what would be seen by the user's left and right eyes if they were looking at a physical object in three dimensional space. However, the use of a stereo display system and of multiple displays more generally are examples only, and other arrangements may be equally suitable.

Figure 21:
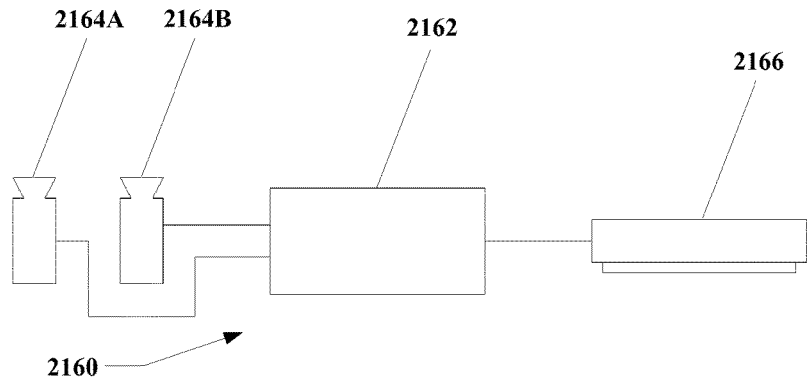
FIG. 21 shows another example embodiment of an apparatus for generating an interface according to the disclosed technique, having dual sensors.

FIG. 21 shows an embodiment of an apparatus 2160 with first and second sensors 2164A and 2164B. The processor 2162 is adapted to generate an interface, with the display 2166 being adapted to output the interface. Such a sensor arrangement may be useful, for example in that first and second sensors 2164A and 2164B may be configured as a stereo system so as to determine the position and/or orientation of objects within the fields of view of the sensors 2164A and 2164B. However, the use of a stereo sensor system and of multiple sensors more generally are examples only, and other arrangements may be equally suitable.

Figure 22:
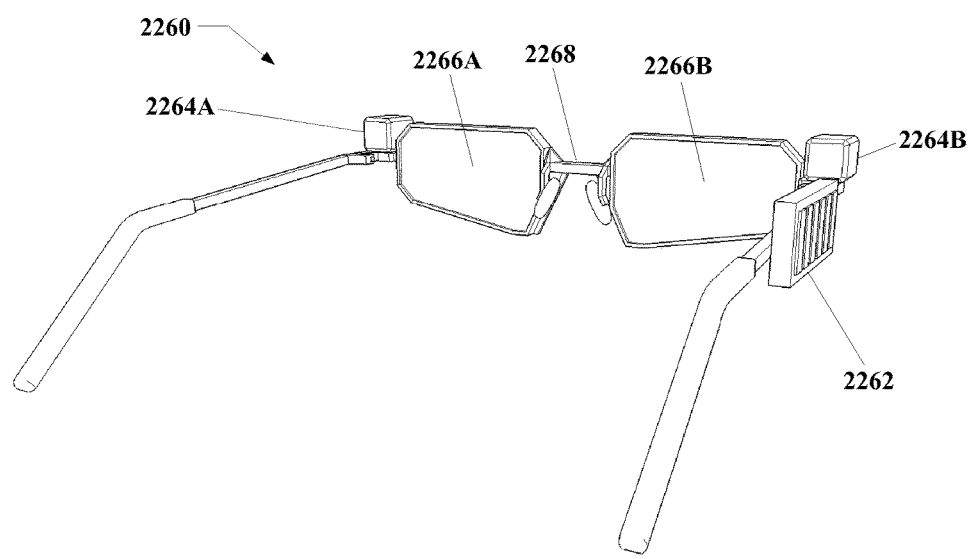
FIG. 22 shows an example embodiment of an apparatus for generating an interface according to the disclosed technique, incorporated in a head mounted display.

The disclosed technique may be incorporated into and/or utilized with a broad range of other devices. For example, FIG. 22 shows an arrangement of an apparatus 2260 in accordance with the disclosed technique as incorporated with a wearable device, in particular a head mounted display. The embodiment shown in FIG. 22 includes a processor 2262, first and second sensors 2264A and 2264B in a stereo arrangement, and first and second displays 2266A and 2266B also in a stereo arrangement. In addition, the apparatus 2260 includes a body 2268 in the form of a frame for a head mounted display; as shown the body 2268 resembles a pair of glasses, but this is an example only, and other configurations may be equally suitable.

The displays 2266A and 2266B are disposed on the body 2268, with the body 2268 being configured and the displays 2266A and 2266B being disposed thereon such that when a user wears the apparatus 2260, the displays 2266A and 2266B are disposed proximate to and substantially aligned with the user's eyes. Likewise, the sensors 2264A and 2264B are disposed on the body 2268 such that when a user wears the apparatus 2260 the field of view of the sensors 2264A and 2264B includes a region in front of the user, e.g. where the user would execute hand motions as input. In the arrangement of FIG. 22, the processor 2262 is also disposed on the body 2268. However, such an arrangement is presented as an example only, and other embodiments may be equally suitable.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method comprising:
    defining, by a processor of a head-mounted device, a first hand gesture by a user for a first augmented-reality user interface;
    sensing, by a sensor of the head-mounted device, the first hand gesture in a three-dimensional environment;
    in response to sensing the first hand gesture, generating, by the processor, the first augmented-reality user interface, wherein the first augmented-reality user interface includes:
    a first manipulation site configured to receive a first input from a first digit of a hand of the user; and
    a second manipulation site configured to receive a second input from a second digit of the hand of the user;
    displaying, by a display of the head-mounted device, the first manipulation site at a first point proximate to and aligned with the first digit of the hand; and
    displaying, by the display of the head-mounted device, the second manipulation site at a second point proximate to and aligned with the second digit of the hand.

2. The method of claim 1, wherein the three-dimensional environment comprises a real-world environment.

3. The method of claim 1, wherein the three-dimensional environment comprises an augmented reality environment.

4. The method of claim 1, wherein the three-dimensional environment comprises a virtual reality environment.

5. The method of claim 1, wherein the first hand gesture comprises a hand posture.

6. The method of claim 1, wherein the first hand gesture comprises at least three digits of the hand being substantially extended.

7. The method of claim 6, wherein the three digits include a thumb, a first finger, and a second finger of the hand.

8. The method of claim 6 wherein sensing the first hand gesture comprises determining a position of at least three digits of the hand.

9. The method of claim 6 wherein the first hand gesture is a substantially static posture.

10. The method of claim 6 wherein the first hand gesture is as a dynamic gesture.

11. The method of claim 1, wherein the sensor is an optical sensor.

12. The method of claim 1, wherein the first hand gesture comprises at least three digits of the hand being at least partially spread apart.

13. The method of claim 12, wherein the at least partial spreading apart comprises at least two gaps of at least partial spreading between at least three groups of at least one of the three digits.

14. The method of claim 1, wherein the first hand gesture comprises transitioning from a first configuration of the hand to a second configuration of the hand.

15. The method of claim 1, wherein the first hand gesture comprises transitioning from a first configuration of the hand wherein at least a thumb, a first finger, and a second finger of the hand are substantially clenched together to a second configuration of the hand wherein at least the thumb, the first finger, and the second finger of the hand are substantially extended.

16. The method of claim 1, wherein the first hand gesture comprises transitioning from a first configuration of the hand wherein at least a thumb, a first finger, and a second finger of the hand are pinched together so as to be in contact at tips thereof to a second configuration of the hand wherein at least the thumb, the first finger, and the second finger of the hand are substantially extended.

17. The method of claim 1, further comprising outputting the first augmented-reality user interface so as to be substantially aligned with a plane defined by tips of the first digit and the second digit.

18. The method of claim 1, wherein the first augmented-reality user interface is substantially aligned with a plane defined by a palm of the hand.

19. The method of claim 1, further comprising displaying the first augmented-reality user interface in front of the hand.

20. The method of claim 1, further comprising displaying at least a portion of the first augmented-reality user interface so as to be in contact with at least one of the digits of the hand.

21. The method of claim 1, further comprising
defining, by the processor, an input manipulation for the manipulation site; and
in response to the input manipulation being applied to the manipulation site, executing an instruction corresponding to the input manipulation.

22. The method of claim 1, wherein the first manipulation site comprises a contact site.

23. The method of claim 1, wherein the first augmented-reality user interface comprises a graphical user interface.

24. The method of claim 1, wherein the first augmented-reality user interface comprises a visible marking corresponding with the first manipulation site.

25. The method of claim 1, wherein the first augmented-reality user interface includes a third manipulation site configured to receive a third input from the second digit of the hand of the user.

26. The method of claim 1, wherein the first manipulation site and the second manipulation site are disposed substantially in at least a partial ring substantially circumscribing at least a portion of the hand.

27. The method of claim 1, wherein the first manipulation site and the second manipulation site are disposed substantially adjacent so as to be substantially continuous.

28. The method of claim 1, wherein the first manipulation site and the second manipulation site are discrete manipulation sites.

29. The method of claim 1, further comprising:
defining, by the processor, an active condition for the first manipulation site;
generating, by the processor, a input when the sensor detects an input manipulation is applied at the first manipulation site; and
defining, by the processor, an inactive condition for the first manipulation site, wherein the processor does not generate the input when the sensor detects the input manipulation applied at the first manipulation site.

30. The method according to claim 29, further comprising switching the first manipulation site from the inactive condition to the active condition.

31. The method according to claim 29, further comprising:
defining, by the processor, a first switch manipulation to switch the first manipulation site from the active condition to the inactive condition; and
defining, by the processor, a second switch manipulation to switch the first manipulation site from the inactive condition to the active condition.

32. The method according to claim 29, further comprising displaying the first manipulation site when the first manipulation site is in the inactive condition.

33. The method of claim 1, further comprising:
displaying the first manipulation site in at least a first partial ring; and
displaying the second manipulation site in at least a second partial ring, wherein the first partial ring and the second partial ring are disposed substantially in substantially concentric partial rings substantially circumscribing at least a portion of said hand.

34. The method of claim 1, further comprising displaying the first manipulation site proximate a tip of one of the first digit.

35. The method of claim 1, further comprising configuring the first augmented-reality user interface based at least in part on at least one of:
a status of the three-dimensional environment,
a content of the three-dimensional environment,
a location within the three-dimensional environment of the first augmented-reality user interface,
a location of the three-dimensional environment,
a time,
conditions within the three-dimensional environment,
conditions external to the three-dimensional environment,
an identity of the user,
a condition of the user, or
a non-input behavior of the user.

36. The method of claim 1, further comprising generating content of the first user interface based at least in part on at least one of:
a status of the three-dimensional environment,
a content of the three-dimensional environment,
a location within the three-dimensional environment of the first user interface,
a location of the three-dimensional environment,
a time,
conditions within the three-dimensional environment,
conditions external to the three-dimensional environment,
an identity of the user,
a condition of the user, or
a non-input behavior of the user.

37. The method of claim 1, further comprising defining the first hand gesture to be substantially identical for substantially all times, places, and conditions in the three-dimensional environment.

38. The method of claim 1, further comprising:
defining, by the processor of the head-mounted device, a second hand gesture by the user for a second augmented-reality user interface;
sensing, by the sensor of the head-mounted device, the second hand gesture in the three-dimensional environment;
in response to sensing the second hand gesture, generating, by the processor, the second augmented-reality user interface, wherein the second augmented-reality user interface includes:
a third manipulation site configured to receive a third input from the first digit of the hand of the user, wherein the third manipulation site is different than the first manipulation site; and
a fourth manipulation site configured to receive a fourth input from the second digit of the hand of the user, wherein the fourth manipulation site is different than the second manipulation site;
displaying, by the display of the head-mounted device, the third manipulation site at a third point proximate to and aligned with the first digit of the hand; and displaying, by the display of the head-mounted device, the fourth manipulation at a fourth point proximate to and aligned with the second digit of the hand.

39. The method of claim 38, wherein the first augmented reality user interface and the second augmented reality user interface are different.

40. The method of claim 1, wherein the first augmented-reality user interface includes:
a third manipulation site configured to receive a third input from the first digit of the first hand; and
a fourth manipulation site configured to receive a fourth input from the second digit of the first hand.

41. An apparatus, comprising:
a sensor adapted to sense a first hand gesture;
a processor coupled to the sensor, the processor adapted to:
define the first hand gesture by a user for a first augmented-reality user interface;
in response to sensing the first hand gesture, generate a first user interface,
wherein the first augmented-reality user interface includes:
a first manipulation site configured to receive a first input from a first digit of a hand of the user; and
a second manipulation site configured to receive a second input from a second digit of the hand of the user;
a display coupled to the processor, the display operable to:
display the first manipulation site at a first point proximate to and aligned with the first digit of the hand; and
display the second manipulation site at a second point proximate to and aligned with the second digit of the hand.

42. The apparatus of claim 41, wherein the display is adapted to display the first augmented-reality user interface in a physical environment.

43. The apparatus of claim 41, wherein the display comprises a stereo display.

44. The apparatus of claim 41, wherein the sensor comprises a stereo sensor.

45. The apparatus of claim 41, wherein the sensor comprises an image sensor.

46. The apparatus of claim 41, wherein the processor, the display, and the sensor are disposed on a wearable device.

47. The apparatus of claim 41, wherein the processor, the display, and the sensor are disposed on a head-mounted display.

48. An apparatus comprising:
means for defining a first hand gesture by a user for an augmented-reality user interface;
means for sensing the first hand gesture;
means for generating a user interface in response to sensing the first hand gesture, wherein the augmented-reality user interface includes:
a first manipulation site configured to receive a first input from a first digit of a hand of the user; and
a second manipulation site configured to receive a second input from a second digit of the hand of the user;
means for displaying the first manipulation site at a first point proximate to and aligned with the first digit of the hand; and
means for displaying the second manipulation site at a second point proximate to and aligned with the second digit of the hand.

49. A method comprising:
defining, by a processor, a first hand gesture by a user for a first augmented-reality user interface;
defining, by the processor, a second hand gesture by the user for a second augmented-reality user interface;
sensing, by a sensor, the first hand gesture in a three-dimensional environment;
sensing, by the sensor, the second hand gesture in the three-dimensional environment;
in response to sensing the first hand gesture, generating, by the processor, the first augmented-reality user interface, wherein the first augmented-reality user interface includes:
a first manipulation site configured to receive a first input from a first digit of a hand of the user; and
a second manipulation site configured to receive a second input from a second digit of the hand of the user;
in response to sensing the second hand gesture, generating, by the processor, the second user augmented-reality interface, wherein the second augmented-reality user interface includes:
a third manipulation site configured to receive a third input from the first digit of a hand of the user, wherein the third manipulation site is different than the first manipulation site; and
a fourth manipulation site configured to receive a fourth input from the second digit of the hand of the user, wherein the fourth manipulation site is different than the second manipulation site;
displaying, by a display, the first manipulation site at a first point proximate to and aligned with the first digit of the hand;
displaying, by the display, the second manipulation site at a second point proximate to and aligned with the second digit of the hand;
displaying, by the display, the third manipulation site at a third point proximate to and aligned with the first digit of the hand; and
displaying, by the display, the fourth manipulation at a fourth point proximate to and aligned with the second digit of the hand.

50. An apparatus, comprising:
a processor adapted to:
define a hand gesture by a user for a augmented-reality user interface;
in response to sensing the hand gesture, generate a first user interface, wherein the augmented-reality user interface includes:
a first manipulation site configured to receive a first input from a digit of a first hand of the user; and
a second manipulation site configured to receive a second input from a digit of a second hand of the user; and
a display coupled to the processor, the display operable to:
display the first manipulation site at a first point proximate to the digit of the first hand; and
display the second manipulation site at a second point proximate to the digit of the second hand.

* * * * *